(12) United States Patent
Nakamura et al.

(10) Patent No.: US 11,327,441 B2
(45) Date of Patent: May 10, 2022

(54) MECHANICAL COMPONENT, MECHANISM MODULE, MOVEMENT, AND TIMEPIECE

(71) Applicant: Seiko Instruments Inc., Chiba (JP)

(72) Inventors: Takahiko Nakamura, Chiba (JP); Natsuki Ebihara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 469 days.

(21) Appl. No.: 15/889,833

(22) Filed: Feb. 6, 2018

(65) Prior Publication Data

US 2018/0231938 A1 Aug. 16, 2018

(30) Foreign Application Priority Data

Feb. 10, 2017 (JP) .............................. JP2017-023161
Nov. 7, 2017 (JP) .............................. JP2017-214949

(51) Int. Cl.
| | |
|---|---|
| *G04B 31/08* | (2006.01) |
| *G04B 31/04* | (2006.01) |
| *F16C 33/66* | (2006.01) |
| *C09D 4/00* | (2006.01) |
| *F16C 3/035* | (2006.01) |
| *F16C 33/10* | (2006.01) |
| *F16C 17/02* | (2006.01) |

(52) U.S. Cl.
CPC ............ *G04B 31/08* (2013.01); *C09D 4/00* (2013.01); *F16C 3/035* (2013.01); *F16C 17/026* (2013.01); *F16C 33/10* (2013.01); *F16C 33/103* (2013.01); *F16C 33/664* (2013.01); *G04B 31/04* (2013.01); *F16C 2202/60* (2013.01); *F16C 2361/61* (2013.01)

(58) Field of Classification Search
CPC .......... G04B 31/08; G04B 31/04; C09D 4/00; F16C 33/664

See application file for complete search history.

(56) References Cited

U.S. PATENT DOCUMENTS 5,346,633 A 9/1994 Nakakawaji et al.
2010/0254230 A1 10/2010 Takeuchi et al.

FOREIGN PATENT DOCUMENTS

| DE | 238812 A1 * | 9/1986 |
|---|---|---|
| JP | S 48-075264 A | 10/1973 |
| JP | 57105493 A * | 6/1982 |
| JP | 2001059082 A * | 3/2001 |
| JP | 2001-288452 A | 10/2001 |

(Continued)

OTHER PUBLICATIONS

Derwent Abstract_DD_238812_A1; Method for Preparation of antispread lubricants forbearings and sliding elements; U.S. Appl. No. 09/031,986; Derwent; whole document (Year: 1986).*

(Continued)

*Primary Examiner* — Tahseen Khan
(74) *Attorney, Agent, or Firm* — Crowell & Moring LLP

(57) ABSTRACT

A mechanical component, a mechanism module, a movement, and a timepiece superior in lubricating oil retaining performance are to be provided. A mechanical component includes: a first component having a first surface region; a second component having a second surface region on which the first surface region can slide; and an oil retaining film formed on at least one of the first surface region and the second surface region and more lipophilic than the region.

9 Claims, 16 Drawing Sheets

(56) References Cited

FOREIGN PATENT DOCUMENTS

| | | | |
|---|---|---|---|
| JP | 2007-170584 A | | 7/2007 |
| JP | 2011-174905 A | | 9/2011 |
| JP | 2013-113340 A | | 6/2013 |
| JP | 2013-210057 A | | 10/2013 |
| JP | 2014-095437 A | | 5/2014 |
| JP | 2014095437 A | * | 5/2014 |
| JP | 2015-081866 A | | 4/2015 |

OTHER PUBLICATIONS

Machine_English_translation_JP_2001059082_A; Oil Repellent for Hydrodynamic Bearing and Liquid Dynamic Pressure Bearing Device and Spindle Motor using the Same; Mar. 6, 2001; EPO; whole document (Year: 2001).*
Machine_English_translation_JP_57105493_A; Yajima, T, et. al.; Analogically Displaying Wristwatch; Jun. 30, 1982; EPO; whole document (Year: 1982).*
Machine_English_translation_JP_2014095437_A; Otani, K.et. al.; Thrust Ball Bearing and Manufacturing Method of the Same; May 22, 2014; EPO; whole document (Year: 2014).*
DeRuiter, Jack, "Hydrocarbon Structure and Chemistry: Alkenes," *Principles of Drug Action* 1, Spring 2005, Alkenes, 10 pgs.
Segneanu, Adina Elena, et al, "Organic Compounds FT-IR Spectroscopy," *Macro to Nano Spectroscopy*, Jun. 2012 InTech, Ch. 9, pp. 145-164.
Notice of Reasons for Refusal for Japanese Patent Application No. 2017-214949, dated Jul. 14, 2021, English translation only, 41 pgs.

* cited by examiner

MECHANICAL COMPONENT, MECHANISM MODULE, MOVEMENT, AND TIMEPIECE

RELATED APPLICATIONS

This application claims priority under 35 U.S.C. § 119 to Japanese Patent Application Nos. 2017-023161 filed on Feb. 10, 2017 and 2017-214949 filed on Nov. 7, 2017, the entire content of which are hereby incorporated by reference.

BACKGROUND OF THE INVENTION

1. Field of the Invention

The present invention relates to a mechanical component, a mechanism module, a movement, and a timepiece.

2. Description of Related Art

In a mechanical component used, for example, in a timepiece, in order to mitigate the wear due to the friction caused by sliding during rotation or the like, it is required for the sliding portion to retain lubricating oil. Patent Document 1 (JP-A-2001-288452) discloses a technique according to which an oil repellent film is formed outside the region carrying oil or the like, thereby retaining the lubricating oil in the region.

In a small mechanical component such as a timepiece component, it is difficult form an oil repellent film solely in a specific region, so that it is by no means easy to apply the above-mentioned technique. In view of this, surface treatment is executed on the entire component with a fluorine type processing agent, and the lubricating oil is retained at the oiling position due to the surface tension of the treated surface.

However, the performance of the mechanical component to retain the lubricating oil cannot be regarded as sufficient. Thus, there is the possibility of the mechanical component suffering from wear due to a shortage of lubricating oil.

SUMMARY OF THE INVENTION

It is an object of a mode of the present invention to provide a mechanical component, a mechanism module, a movement, and a timepiece superior in the performance to retain lubricating oil.

According to a mode of the present invention, there is provided a mechanical component including: a first component having a first surface region; a second component having a second surface region on which the first surface region can slide; and an oil retaining film formed on at least one of the first surface region and the second surface region and more lipophilic than the region.

In this construction, the lubricating oil does not easily flow from between the first component and the second component. Thus, it is possible to maintain a state in which lubricating oil exists between the first component and the second component, so that it is possible to suppress deterioration of the first component and the second component due to wear or the like, making it possible to perform a stable operation for a long period of time.

In the mechanical component, it is desirable to form an oil repellent film that is less lipophilic than the region on the region adjacent to the oil retaining film on at least one of the first component and the second component.

In this construction, the lubricating oil does not easily flow from the surface of the oil retaining film. Thus, it is possible to further enhance the oil retaining performance.

It is desirable for the oil retaining film to contain a chemical compound expressed by the following formula (1):

($M_1$ is one of Si, Ti, and Zr. R is a hydrocarbon radical. $Y_1$ and $Y_2$ are hydrocarbon radicals, hydroxyl groups, or functional groups generating hydroxyl groups through hydrolysis or the like. $Z_1$ is a polar group.)

In this construction, it is possible to impart a high oil retaining performance to the oil retaining film.

It is desirable for the oil repellent film to contain a chemical compound expressed by the following formula (2):

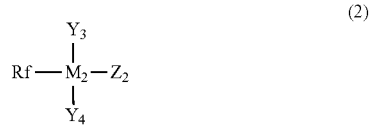

($M_2$ is one of Si, Ti, and Zr. Rf is a fluorine containing radical. $Y_3$ and $Y_4$ are hydrocarbon radicals, hydroxyl groups, or functional groups generating hydroxyl groups through hydrolysis or the like. $Z_2$ is a polar group.)

In this construction, it is possible to enhance the oil repelling performance of the oil repellent film.

It is desirable that the first component be a shaft body rotatable around an axis, and that the second component be a bearing rotatably supporting the shaft body.

In this construction, due to the oil retaining film, it is easy to maintain the state in which there is lubricating oil between the first component and the second component, making it possible to stabilize the operation of the mechanical component for a long period of time.

In the mechanical component, there may be formed in at least one of the first surface region and the second surface region a retaining portion capable of retaining lubricating oil.

In this construction, even in the case where the oil retaining film of the surface region is worn through sliding, it is possible to retain the lubricating oil, making it possible to perform a stable operation for a long period of time.

It is desirable for the retaining portion to be a recess formed in the surface region.

In this construction, even in the case where the oil retaining film of the surface region is worn through sliding, the oil retaining film in the retaining portion is not easily worn. Thus, it is possible for the mechanical component to retain the lubricating oil, making it possible to perform a stable operation for a long period of time.

According to a mode of the present invention, there is provided a mechanism module equipped with the mechanical component.

In this construction, due to the provision of the mechanical component, it is possible to perform a stable operation for a long period of time, making it possible to achieve an improvement in terms of reliability.

According to a mode of the present invention, there is provided a movement equipped with the mechanical component.

In this construction, due to the provision of the mechanical component, it is possible to perform a stable operation for a long period of time, making it possible to achieve an improvement in terms of reliability.

According to a mode of the present invention, there is provided a timepiece equipped with the movement.

In this construction, due to the provision of the mechanical component, it is possible to perform a stable operation for a long period of time, making it possible to achieve an improvement in terms of reliability.

According to a mode of the present invention, it is possible to exert a high oil retaining performance with respect to lubricating oil.

BRIEF DESCRIPTION OF THE DRAWINGS

FIG. 30 is a schematic diagram illustrating a second example of the overall configuration of the recess.

FIG. 31 is a schematic diagram illustrating a third example of the overall configuration of the recess.

FIG. 32 is a schematic diagram illustrating a fourth example of the overall configuration of the recess.

DETAILED DESCRIPTION OF THE EMBODIMENTS

Embodiments of the present invention will be described with reference to the drawings.

First Embodiment

A timepiece component 10 (mechanical component) according to the first embodiment of the present invention will be described with reference to FIGS. 1 through 4.

Figure 1:
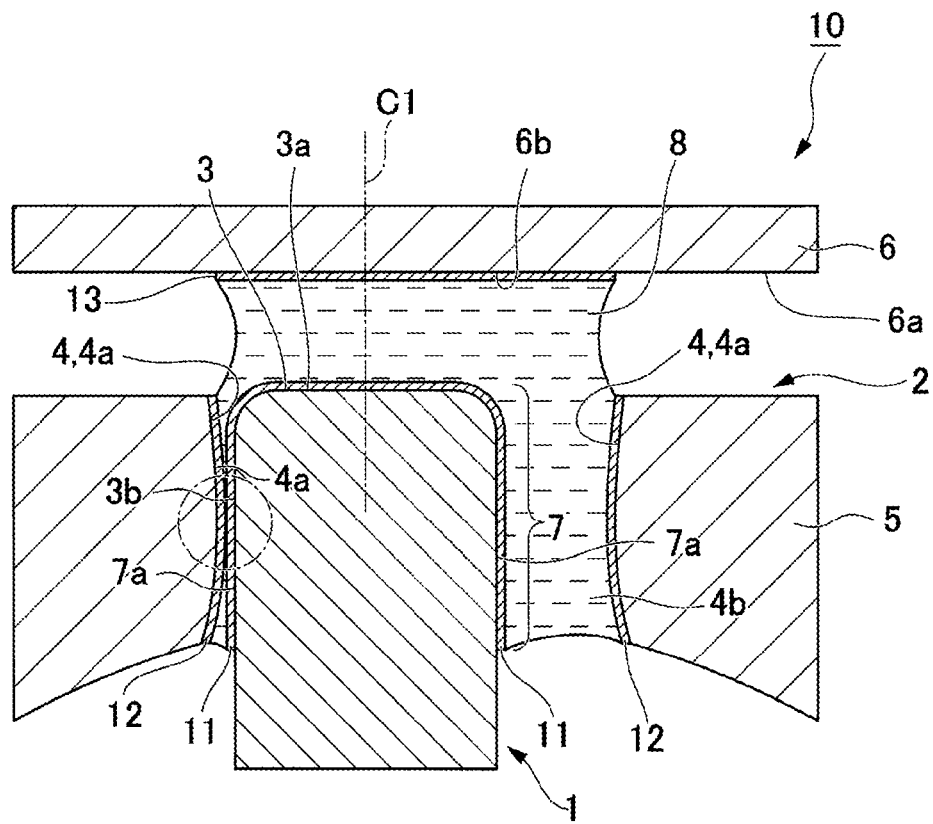
FIG. 1 is a sectional view of a mode of a mechanical component according to a first embodiment of the present invention.
Figure 2:
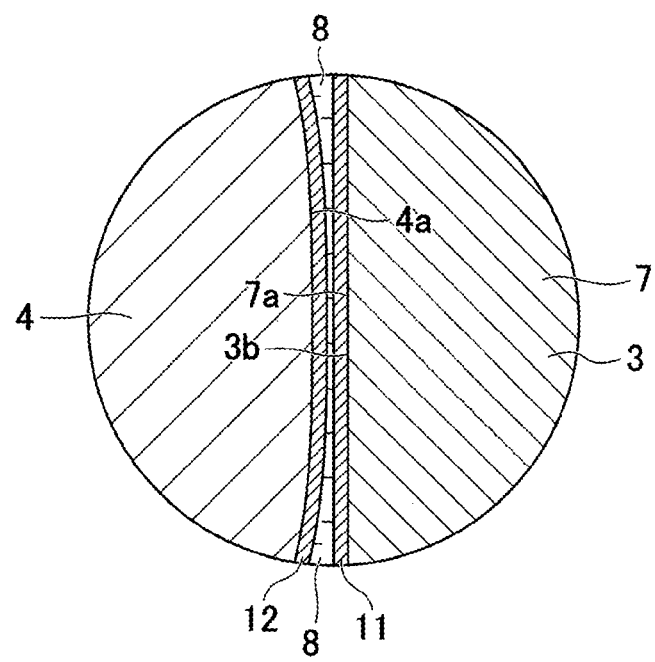
FIG. 2 is a partial enlarged sectional view of the mechanical component shown in FIG. 1.
Figure 3:
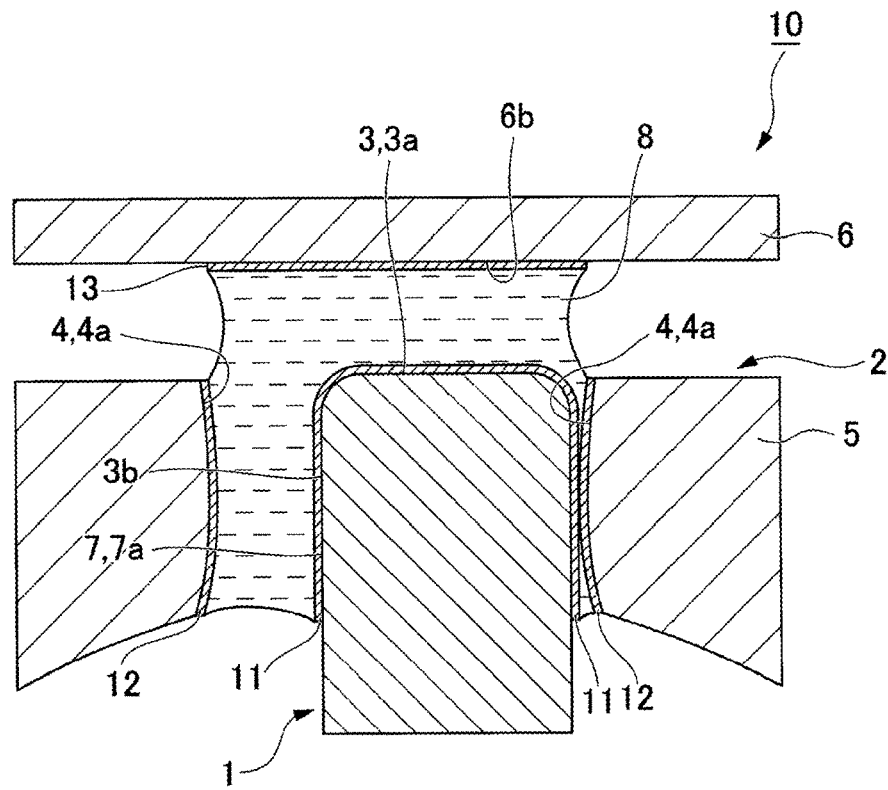
FIG. 3 is a sectional view of another mode of the mechanical component shown in FIG. 1.
Figure 4:
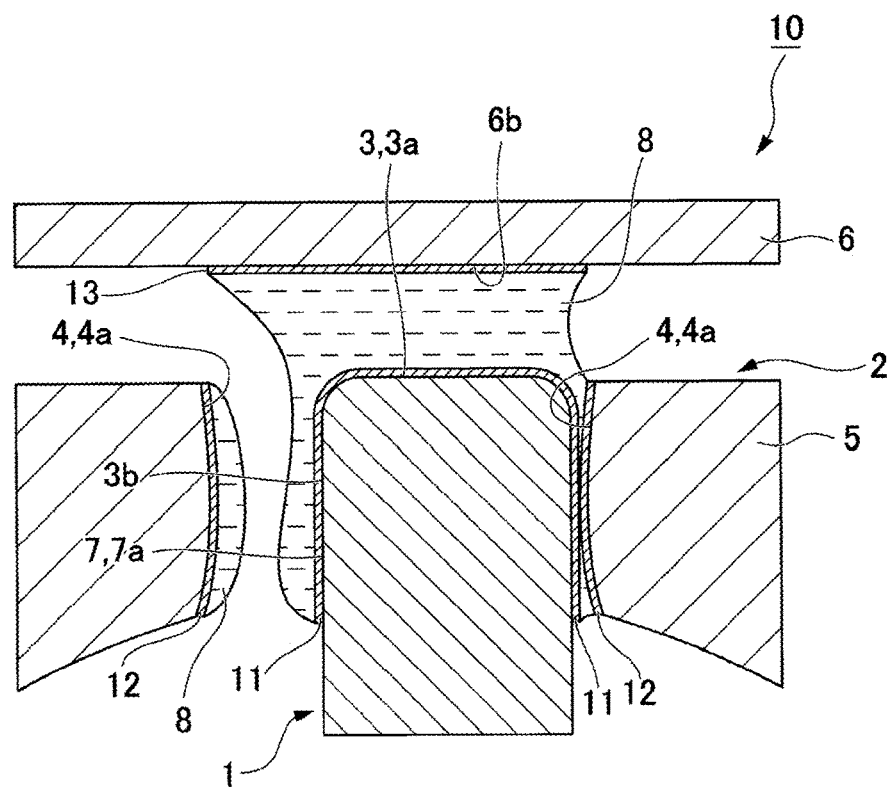
FIG. 4 is a sectional view of still another mode of the mechanical component shown in FIG. 1.

FIG. 1 is a sectional view of a mode of the timepiece component 10. FIG. 2 is an enlarged sectional view of a part of the timepiece component 10. FIG. 2 is an enlarged view of the encircled portion of FIG. 1. FIG. 3 is a sectional view of another mode of the timepiece component 10. FIG. 4 is a sectional view of still another mode of the timepiece component 10. A plan view is a view as seen in a direction parallel to the center axis of the shaft body.

(Mechanical Component)

As shown in FIGS. 1 and 2, the timepiece component 10 is equipped with a shaft body 1 (first component), a bearing 2 (second component), and first through third oil retaining films 11 through 13.

The shaft body 1 is formed in a columnar configuration. The distal end portion of the shaft body 1 is referred to as a tenon portion 3. The portion of the tenon portion 3 inserted into a through-hole 4 of a hole jewel 5 will be referred to as an inserted portion 7. An outer peripheral surface 7a (first surface region) of the inserted portion 7 is a region extending over the entire periphery of the inserted portion 7. Symbol C1 indicates the center axis of the tenon portion 3. The shaft body 1 is a shaft portion of a rotary body such as a movement barrel, a center wheel & pinion, a third wheel & pinion, a second wheel & pinion, an escape wheel & pinion, a pallet fork, a balance with hairspring, a counter portion, and a slip mechanism.

The bearing 2 is equipped with the hole jewel 5 having the through-hole 4, and a cap jewel 6. The bearing 2 is, for example, a vibration-proof bearing.

The hole jewel 5 is formed, for example, of ruby. The hole jewel 5 is formed in a circular configuration, for example, in plan view.

The through-hole 4 is formed so as to extend through the hole jewel 5 in the thickness direction. The through-hole 4 is formed in a circular configuration, for example, in plan view. The inner diameter of the through-hole 4 is determined so as to allow insertion of the tenon portion 3. For example, the inner diameter of the through-hole 4 is larger than the outer diameter of the tenon portion 3. An inner peripheral surface 4a of the through-hole 4 (second surface region) is a region extending over the entire periphery of the through-hole 4. The inner peripheral surface 4a of the through-hole 4 (second surface region) faces the outer peripheral surface 7a of the inserted portion 7 (first surface region).

The cap jewel 6 is formed, for example, of ruby. The cap jewel 6 is formed in a circular configuration, for example, in plan view. A distal end surface 3a of the tenon portion 3 is arranged opposite an opposing surface 6a of the cap jewel 6 (the surface opposite the hole jewel 5). The region of the opposing surface 6a facing an inner space 4b of the through-hole 4 will be referred to as a facing region 6b. For example, in plan view, the facing region 6b is of a circular configuration coinciding with the through-hole 4. The distal end surface 3a of the tenon portion 3 may be brought into contact with the facing region 6b.

The bearing 2 supports the shaft body 1 so as to be rotatable around the center axis C1.

(Oil Retaining Film)

The first oil retaining film 11 is formed on the distal end surface 3a of the tenon portion 3 and on the outer peripheral surface 7a of the inserted portion 7. The first oil retaining film 11 is more lipophilic than the formation surfaces (the distal end surface 3a and the outer peripheral surface 7a). The second oil retaining film 12 is formed on the inner peripheral surface 4a of the through-hole 4 of the hole jewel 5. The second oil retaining film 12 is more lipophilic than the formation surface (the inner peripheral surface 4a).

The third oil retaining film 13 is formed in the facing region 6b of the cap jewel 6. The third oil retaining film 13 is more lipophilic than the formation surface (the facing region 6b).

An example of an index of lipophilic property is a contact angle with respect to oil. The contact angle can be evaluated, for example, by dropping approximately 2 μl of oleic acid onto the surface of an object of measurement, and by measuring the angle of the droplet with respect to the surface of the object of measurement 10 seconds after the dropping by a contact angle meter (CA-X200, manufactured by Kyowa Interface Science Co., Ltd) at room temperature (approximately 25° C.). The contact angle may be measured by using, instead of oleic acid, the lubricating oil 8 supplied (for example, poly-α-olefin (PAO)). For the measurement of the contact angle, a method according to JIS R3257 may be applied.

When the contact angle on the surface of the oil retaining films 11 through 13 is smaller than the contact angle on the formation surface, the oil retaining films 11 through 13 may be regarded as more lipophilic than the formation surface. The oil retaining films 11 through 13 are formed, for example, of a material of higher surface energy than the material of the formation surface.

The oil retaining films 11 through 13 contain, for example, a chemical compound expressed by the following formula (3).

$$R-\underset{Y_2}{\overset{Y_1}{M_1}}-Z_1 \tag{1}$$

($M_1$ is one of Si, Ti, and Zr. R is a hydrocarbon radical. $Y_1$ and $Y_2$ are hydrocarbon radicals, hydroxyl groups, or functional groups generating hydroxyl groups through hydrolysis or the like. $Z_1$ is a polar group.)

Examples of the hydrocarbon radical include an alkyl group and an aryl group. It is desirable for the hydrocarbon radical to be an alkyl group. The alkyl group is expressed by the formula: $C_nH_{2n+1}$ (n: natural number). It is desirable for n to satisfy the formula: $6 \leq n \leq 10$. When n is 6 or more, it is possible to enhance the oil retaining property. When n is 10 or less, it is possible to avoid deterioration in the film quality of the oil retaining film due to steric hindrance. When n is 10 or less, it is possible to shorten the requisite time for the polymerization reaction.

Examples of the "functional groups generating hydroxyl groups through hydrolysis or the like" include alkoxy group, aminoxy group, ketoxime group, and acetoxy group. It is possible to use one or two or more of these groups. The alkoxy group is, for example, methoxy group, ethoxy group, and propoxy group. It is possible to use 1 or 2 or more of these groups.

The polar group is a functional group exhibiting polarity. Examples of the polar group include: hydroxyl group, carboxy group, sulfo group, amino group, phosphate group, phosphino group, silanol group, epoxy group, isocyanate group, cyano group, vinyl group, and thiol group. It is possible to use 1 or 2 or more of these groups.

In the chemical compound expressed by formula (3), the functional groups represented by $Z_1$, $Y_1$, and $Y_2$ may be wanting in a part of the component element due to the coupling. For example, the hydroxyl group (—OH) as $Z_1$ may assume the mode "—O—" by coupling with the formation surface through dehydration condensation. The hydroxyl groups (—OH) as another $Y_1$ or $Y_2$ may assume the mode "—O—" by coupling with another $Y_1$ or $Y_2$ through dehydration condensation. Similarly, the carboxy group (—COOH) may assume the mode "—COO—" through coupling.

The content of the chemical compound shown in formula (3) in the oil retaining films 11 through 13 is, for example, 50 mass % or more.

In the chemical compound shown in formula (3), for example, the polar group is coupled with or adheres to the material forming the formation surface (the distal end surface 3a, the outer peripheral surface 7a, the inner peripheral surface 4a, and the opposing region 6b) (for example, an inorganic substance such as a metal) through dehydration condensation, hydrogen bonding or the like. The chemical compound shown in formula (3) can impart a high oil retaining performance to the oil retaining films 11 through 13.

Examples of the chemical compound shown in formula (3) include the chemical compound expressed by the following formula (4).

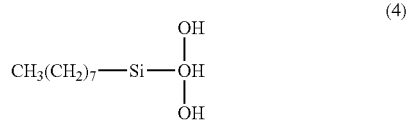

The chemical compound shown in formula (3) can be obtained, for example, through hydrolysis of the chemical compound expressed by the following formula (5).

($M_1$ is one of Si, Ti, and Zr. R is a hydrocarbon radical. $Y_1$ and $Y_2$ are hydrocarbon radicals, hydroxyl groups, or functional groups generating hydroxyl groups through hydrolysis or the like. $X_1$ is a functional group generating a hydroxyl group through hydrolysis or the like.)

Examples of the "functional groups generating hydroxyl groups through hydrolysis or the like" include alkoxy group, aminoxy group, ketoxime group, and acetoxy group. It is possible to use one or two or more of these groups. The alkoxy group is, for example, methoxy group, ethoxy group, and propoxy group. It is possible to use 1 or 2 or more of these groups. Examples of the chemical compound expressed by formula (5) include octyltriethoxysilane (e.g., n-octyltriethoxysilane) shown in formula (6).

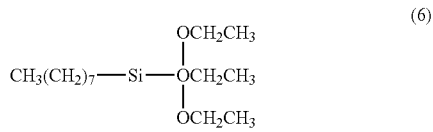

(Formation of the Oil Retaining Film)

To form the oil retaining films 11 through 13, there is used, for example, an oil retaining processing agent containing an oil retaining agent containing the chemical compound of formula (3) and a solvent. An additive (for example, a catalytic hardener such as dibutyltin diuralate) may be added to the oil retaining agent. The addition amount of the additive is, for example, 0.001 through 5 mass %. As the solvent, it is possible to use alcohol, ketone or the like. Examples of the alcohol include methanol, ethanol, 1-propanol, isopropyl alcohol, and 1-butanol. Examples of the ketone include acetone and methyl ethyl ketone. The oil retaining agent may contain no solvent.

To form the oil retaining films 11 through 13, the above oil retaining processing agent is applied to the formation surfaces (the distal end surface 3a, the outer peripheral surface 7a, the inner peripheral surface 4a, and the facing region 6b) to form an application film. This application film is dried, and the solvent is removed, whereby the oil retaining films 11 through 13 are obtained.

(Operation of the Timepiece Component)

A lubricating oil 8 is supplied between the shaft body 1 and the bearing 2. Examples of the lubricating oil 8 include: an aliphatic hydrocarbon oil such as poly-α-olefin (PAO) and polybutene; an aromatic hydrocarbon oil such as alkylbenzene and alkylnaphthalene; an ester oil such as polyol ester and phosphoric ester; an ether oil such as polyphenyl ether; polyalkyrene glycol oil; silicone oil; and fluorine oil.

The shaft body 1 rotates around the center axis C1 with respect to the bearing 2. There is the possibility of a part of the outer peripheral surface of the shaft body 1 (the outer peripheral surface 7a of the inserted portion 7) sliding on the inner peripheral surface of the bearing 2 (the inner peripheral surface 4a of the through-hole 4).

The timepiece component 10, which has the highly lipophilic oil retaining films 11 through 13, exerts a high oil retaining performance with respect to the lubricating oil 8. Thus, when vibration is applied to the timepiece component 10, and when, as shown in FIG. 3, the position of the tenon portion 3 in the through-hole 4 fluctuates, the lubricating oil 8 does not easily flow out of the sliding portion (the portion between the shaft body 1 and the bearing 2). Thus, it is possible to maintain the state in which the lubricating oil 8 exists in the sliding portion (the portion between the shaft body 1 and the bearing 2), so that it is possible to suppress deterioration due to wear or the like of the shaft body 1 and the bearing 2, and to perform a stable operation for a long period of time.

Further, as shown in FIG. 4, even when a gap is generated between the tenon portion 3 and the inner peripheral surface 4a of the through-hole 4, the lubricating oil 8 remains on the surface of the oil retaining films 11 through 13. Thus, the oil retaining films 11 through 13 are not exposed, so that even when the shaft body 1 slides with respect to the bearing 2, wear, peeling, etc. of the oil retaining films 11 through 13 do not easily take place. Thus, it is possible to maintain the oil retaining performance and to perform a stable operation for a long period of time.

Second Embodiment

A timepiece component 20 (mechanical component) according to the second embodiment of the present invention will be described with reference to FIGS. 5 through 7.

Figure 5:
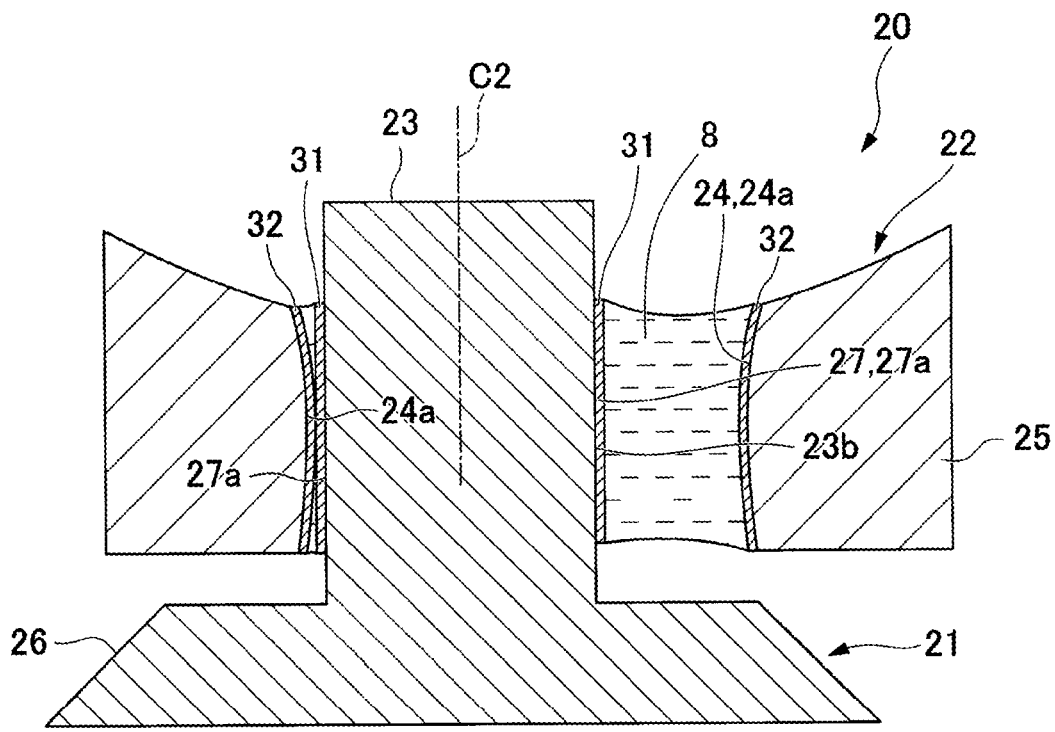
FIG. 5 is a sectional view of a mode of a mechanical component according to a second embodiment of the present invention.
Figure 6:
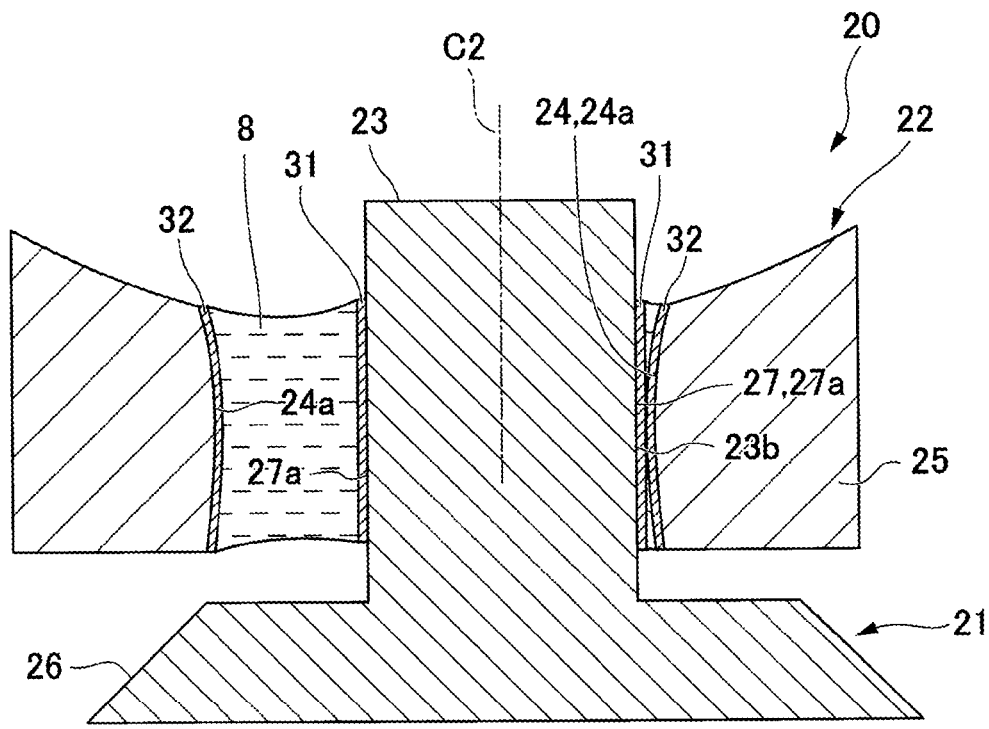
FIG. 6 is a sectional view of another mode of the mechanical component shown in FIG. 5.

FIG. 5 is a sectional view of a mode of the timepiece component 20. FIG. 6 is a sectional view of another mode of the timepiece component 20. FIG. 7 is a sectional view of a still another mode of the timepiece component 20. In the following, the portions common to the above embodiment are indicated by the same reference numerals, and a description thereof will be left out.

As shown in FIG. 5, the timepiece component 20 is equipped with a shaft body 21 (first component), a bearing 22 (second component), and oil retaining films 31 and 32.

The shaft body 21 is equipped with a small-diameter portion 23 formed in a columnar configuration, and a large-diameter portion 26 continuous with the small-diameter portion 23. The portion of the small-diameter portion 23 inserted into a through-hole 24 of a hole jewel 25 will be referred to as an inserted portion 27.

The bearing 22 is equipped with the hole jewel 25 having the through-hole 24. The hole jewel 25 is, for example, of a circular configuration in plan view.

The through-hole 24 is formed so as to extend through the hole jewel 25 in the thickness direction. The through-hole 24 is formed, for example, in a circular configuration in plan view. The inner diameter of the through-hole 24 is determined so as to allow insertion of the small-diameter portion 23. The inner diameter of the through-hole 24 is larger, for example, than the outer diameter of the small-diameter portion 23. An inner peripheral surface 24a of the through-hole 24 (the second surface region) faces an outer peripheral surface 27a of the inserted portion 27 (the first surface region).

The bearing 22 rotatably supports the shaft body 21 around a center axis C2.

The first oil retaining film 31 is formed on the outer peripheral surface 27a of the inserted portion 27 of the small-diameter portion 23. The first oil retaining film 31 is more lipophilic than the formation surface (the outer peripheral surface 27a).

The second oil retaining film 32 is formed on the inner peripheral surface 24a of the through-hole 24 of the hole jewel 25. The second oil retaining film 32 is more lipophilic than the formation surface (the inner peripheral surface 24a).

The material, etc. of the oil retaining films 31 and 32 may be the same as those of the oil retaining films 11 through 13 of the first embodiment. The oil retaining films 31 and 32 can be formed in the same manner as the oil retaining films 11 through 13.

Between the shaft body 21 and the bearing 22, there is provided the lubricating oil 8. The shaft body 21 rotates around the center axis C2 with respect to the bearing 22. There is the possibility of a part of the outer peripheral surface of the shaft body 21 sliding on the inner peripheral surface of the bearing 22.

The timepiece component 20, which has the highly lipophilic oil retaining films 31 and 32, exerts a high oil retaining performance with respect to the lubricating oil 8. Thus, when vibration is applied to the timepiece component 20, and when, as shown in FIG. 6, the position of the small-diameter portion 23 in the through-hole 24 fluctuates, the lubricating oil 8 does not easily flow out of the sliding portion (the portion between the shaft body 21 and the bearing 22). Thus, it is possible to maintain the state in which the lubricating oil 8 exists in the sliding portion (the portion between the shaft body 21 and the bearing 22), so that it is possible to suppress deterioration due to wear or the like of the shaft body 21 and the bearing 22, and to perform a stable operation for a long period of time.

Figure 7:
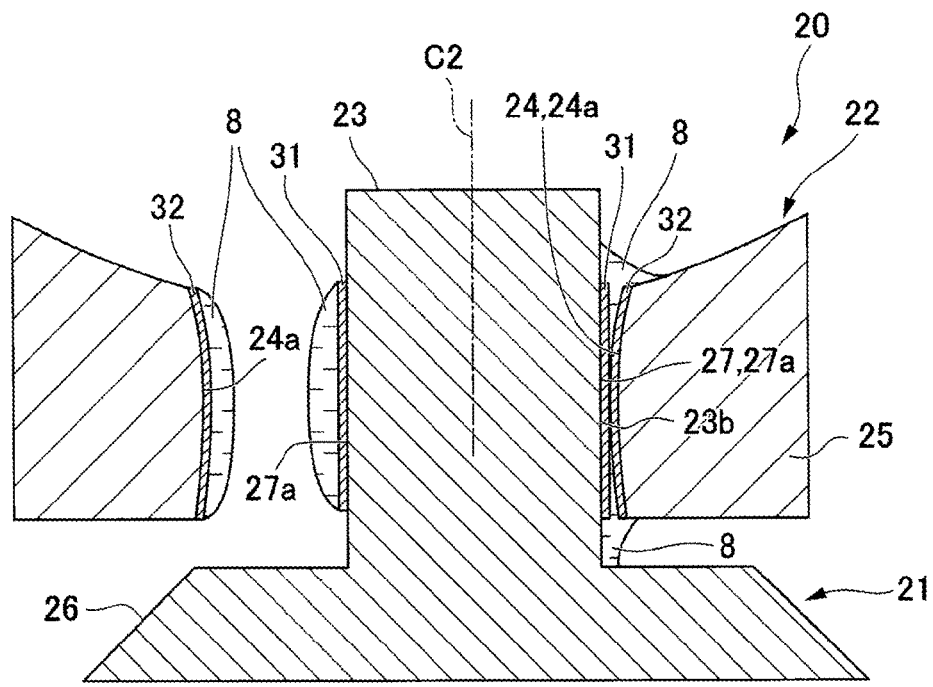
FIG. 7 is a sectional view of still another mode of the mechanical component shown in FIG. 5.

Further, as shown in FIG. 7, even when a gap is generated between the small-diameter portion 23 and the inner peripheral surface 24a of the through-hole 24, the lubricating oil 8 remains on the surface of the oil retaining films 31 and 32. Thus, the oil retaining films 31 and 32 are not exposed, so that even when the shaft body 21 slides with respect to the bearing 22, wear, peeling, etc. of the oil retaining films 31 and 32 do not easily take place. Thus, it is possible to maintain the oil retaining performance and to perform a stable operation for a long period of time.

Third Embodiment

A timepiece component 30 (mechanical component) according to the third embodiment of the present invention will be described with reference to FIG. 8.

Figure 8:
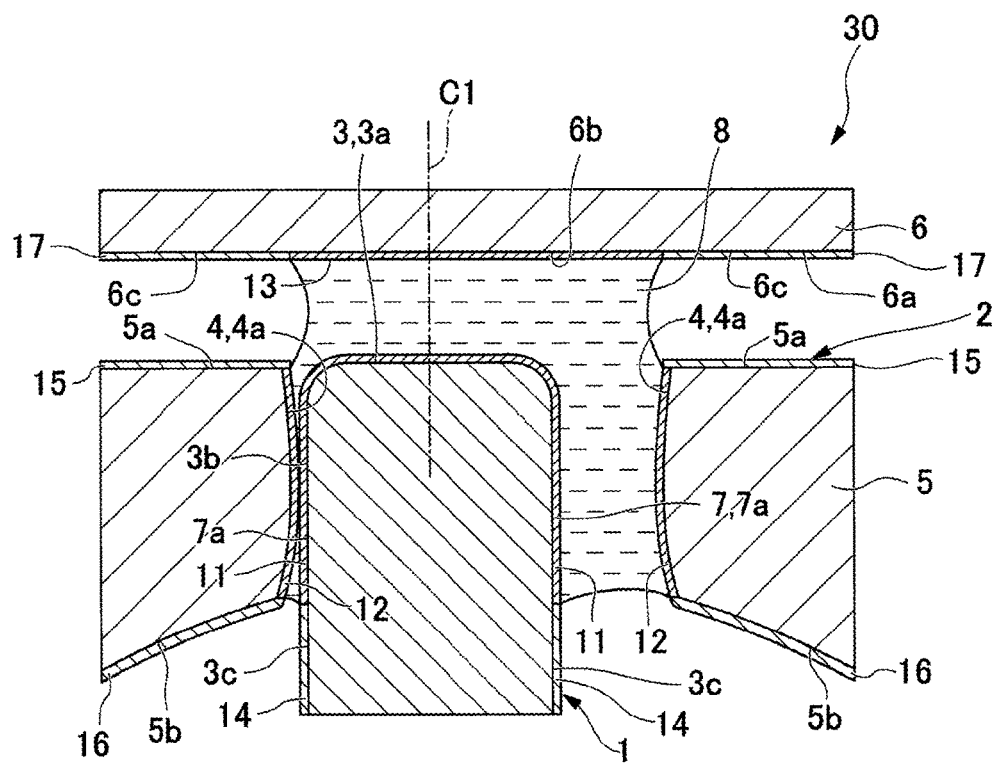
FIG. 8 is a sectional view of a mechanical component according to a third embodiment of the present invention.

FIG. 8 is a sectional view of the timepiece component 30. In the following, the portions common to the above embodiments are indicated by the same reference numerals, and a description thereof will be left out.

As shown in FIG. 8, the timepiece component 30 is of the same construction as the timepiece component 10 of the first embodiment except that oil repellent films 14 through 17 are formed.

In the region of an outer peripheral surface 3b of the tenon portion 3 adjacent to the outer peripheral surface 7a where the oil retaining film 11 is formed (hereinafter referred to as a first adjacent region 3c), there is formed the oil repellent film 14. The oil repellent film 14 is less lipophilic than the formation surface (the first adjacent region 3c).

The first adjacent region 3c is adjacent to the outer peripheral surface 7a over the entire periphery of the tenon portion 3. Thus, the oil repellent film 14 is adjacent to the oil retaining film 11 over the entire periphery of the tenon portion 3. The region where the oil repellent film 14 is formed (the first adjacent region 3c) may be the entire region of the surface of the tenon portion 3 where no oil retaining film 11 is formed or a part of the region.

Of the surface of the hole jewel 5, on a first surface 5a facing the cap jewel 6, there is formed the oil repellent film 15. The oil repellent film 15 is less lipophilic than the formation surface (the first surface 5a). The first surface 5a is an example of the second adjacent region adjacent to the inner peripheral surface 4a on which the oil retaining film 12 is formed. The first surface 5a is a region adjacent to the inner peripheral surface 4a over the entire periphery of the hole jewel 5. Thus, the oil repellent film 15 is adjacent to the oil retaining film 12 over the entire periphery of the hole jewel 5. The oil repellent film 15 may be formed on the entire first surface 5a or a part of the region.

Of the surface of the hole jewel 5, on a second surface 5b which is a surface opposite the first surface 5a, there is formed the oil repellent film 16. The oil repellent film 16 is less lipophilic than the formation surface (the second surface 5b). The second surface 5b is another example of the second adjacent region adjacent to the inner peripheral surface 4a where the oil retaining film 12 is formed. The second surface 5b is a region adjacent to the inner peripheral surface 4a over the entire periphery of the hole jewel 5. Thus, the oil repellent film 16 is adjacent to the oil retaining film 12 over the entire periphery of the hole jewel 5. The oil repellent film 16 may be formed on the entire second surface 5b or a part of the region.

In the region of the opposing surface 6a of the cap jewel 6 adjacent to the facing region 6b (an outer peripheral region 6c), there is formed the oil repellent film 17. The oil repellent film 17 is less lipophilic than the formation surface (the outer peripheral region 6c). The outer peripheral region 6c is a region surrounding the facing region 6b and adjacent to the facing region 6b over the entire periphery of the cap jewel 6. Thus, the oil repellent film 17 is adjacent to the oil retaining film 13 over the entire periphery of the cap jewel 6. The outer peripheral region 6c where the oil repellent film 17 is formed may be all the region of the opposing surface 6a where the oil retaining film 13 is not formed, or a part of the region.

In the case where the contact angle on the surface of the oil repellent films 14 through 17 is larger than the contact angle on the formation surface, the oil repellent films 14 through 17 are to be regarded as less lipophilic than the formation surface. The oil repellent films 14 through 17 are formed, for example, of a material of a lower surface energy than the forming material of the formation surface.

The oil repellent films 14 through 17 contain, for example, the chemical compound expressed by the following formula (7).

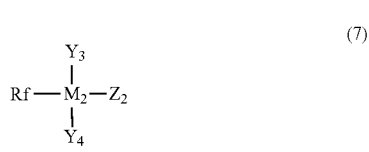

(7)

($M_2$ is one of Si, Ti, and Zr. Rf is a fluorine containing radical. $Y_3$ and $Y_4$ are hydrocarbon radicals, hydroxyl groups, or functional groups generating hydroxyl groups through hydrolysis or the like. $Z_2$ is a polar group.)

Examples of the fluorine containing radical include an alkyl group containing one or a plurality of fluorine atoms. Examples of an alkyl group containing one or a plurality of fluorine atoms include perfluoroalkyl group and perfluoropolyether group.

Examples of the "functional groups generating hydroxyl groups through hydrolysis or the like" include alkoxy group, aminoxy group, ketoxime group, and acetoxy group. It is possible to use one or two or more of these groups. The alkoxy group is, for example, methoxy group, ethoxy group, and propoxy group. It is possible to use 1 or 2 or more of these groups.

The polar group is a functional group exhibiting polarity. Examples of the polar group include: hydroxyl group, carboxy group, sulfo group, amino group, phosphate group, phosphino group, silanol group, epoxy group, isocyanate group, cyano group, vinyl group, and thiol group. It is possible to use 1 or 2 or more of these groups.

The content of the chemical compound shown in formula (7) in the oil repellent films 14 through 17 is, for example, 50 mass % or more.

In the chemical compound shown in formula (7), for example, the polar group is coupled with or adheres to the material forming the formation surface (the first adjacent region 3c, the first surface 5a, the second surface 5b, and the outer peripheral region 6c) (for example, an inorganic substance such as a metal) through dehydration condensation, hydrogen bonding or the like.

In the chemical compound expressed by formula (7), the functional groups represented by $Z_2$, $Y_3$, and $Y_4$ may be wanting in a part of the component element due to the coupling. For example, the hydroxyl group (—OH) as $Z_2$ may assume the mode "—O—" by coupling with the formation surface through dehydration condensation. The hydroxyl groups (—OH) as $Y_3$ and $Y_4$ may assume the mode "—O—" by coupling with another $Y_3$ or $Y_4$ through dehydration condensation. Similarly, the carboxy group (—COOH) may assume the mode "—COO—" through coupling.

The chemical compound shown in formula (7) can enhance the oil repelling performance of the oil repellent films 14 through 17.

Examples of the chemical compound shown in formula (7) include a chemical compound expressed by the following formula (8).

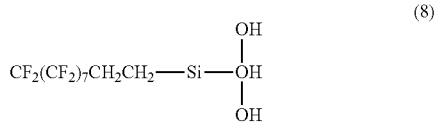

(8)

The chemical compound shown in formula (7) can be obtained, for example, through hydrolysis of the chemical compound expressed by the following formula (9).

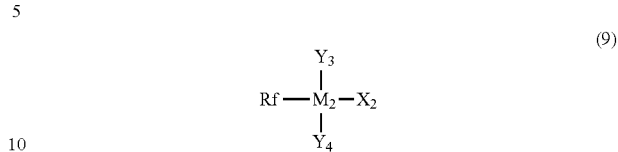

(9)

($X_2$ is a functional group generating hydroxyl groups through hydrolysis or the like.)

Examples of the "functional group generating hydroxyl groups through hydrolysis or the like" include alkoxy group, aminoxy group, ketoxime group, and acetoxy group. It is possible to use one or two or more of these groups. The alkoxy group is, for example, methoxy group, ethoxy group, and propoxy group. It is possible to use 1 or 2 or more of these groups.

Examples of the chemical compound shown in formula (9) include trimethoxy(1H,1H,2H,2H-heptadecafluorodecyl)silane, and triethoxy-1H,1H,2H,2H-tridecafluoro-n-octylsilane. Trimethoxy(1H,1H,2H,2H-heptadecafluorodecyl)silane is a chemical compound expressed by the following formula (10).

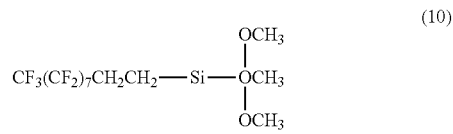

(10)

(Formation of the Oil Repellent Films)

To form the oil repellent films 14 through 17, there is employed, for example, an oil repellent processing agent containing an oil repellent agent containing the chemical compound of formula (7) and a solvent.

An additive (for example, a catalytic hardener such as dibutyltin diuralate) may be added to the oil repellent agent. The addition amount of the additive is, for example, 0.001 through 5 mass %.

As the solvent, it is possible to use the same solvent as used in the oil retaining agent exemplified above. The oil repellent processing agent may contain no solvent.

To form the oil repellent films 14 through 17, the oil repellent processing agent is applied to the formation surface (the first adjacent region 3c, the first surface 5a, the second surface 5b, and the outer peripheral region 6c) to form an application film. This application film is dried, and the solvent is removed therefrom, whereby there are obtained the oil repellent films 14 through 17.

It is desirable for the oil repellent films 14 through 17 to be formed after the formation of the oil retaining films 11 through 13. This makes it possible to form the oil repellent films 14 through 17 adjacent to the oil retaining films 11 through 13 without involving any gaps. As a result, it is possible to reliably prevent the lubricating oil 8 from flowing out from between the shaft body 1 and the bearing 2. Thus, it is possible to prevent the problem (linking) in which the components are caused to stick to each other due to the lubricating oil 8 having flowed out.

The timepiece component 30 has the oil retaining films 11 through 13, so that outflow of the lubricating oil 8 does not easily occur. Thus, as in the case of the timepiece component 10 of the first embodiment, it is possible to perform a stable operation for a long period of time.

The timepiece component 30 has the oil repellent films 14 through 17 adjacent to the oil retaining films 11 through 13, so that the lubricating oil 8 does not easily flow out of the surface of the oil retaining films 11 through 13. Thus, it is possible to further enhance the oil retaining performance of the oil retaining films 11 through 13. Thus, it is possible to perform a stable operation for a long period of time.

Fourth Embodiment

A timepiece component 40 (mechanical component) according to the fourth embodiment of the present invention will be described with reference to FIG. 9.

Figure 9:
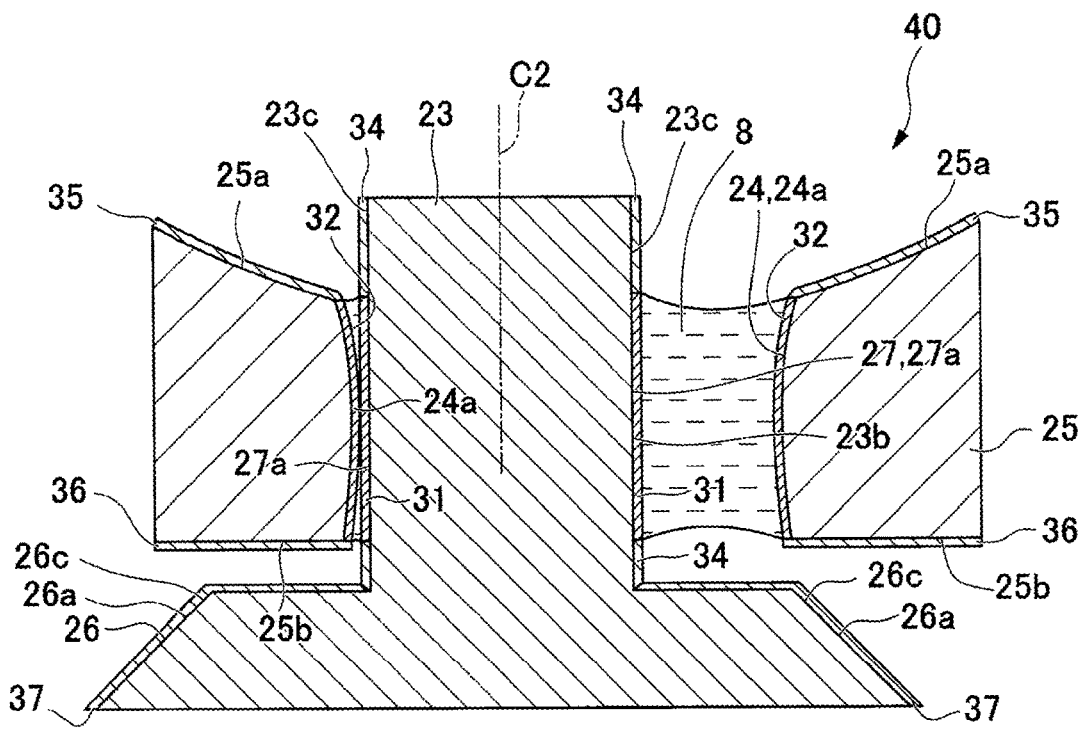
FIG. 9 is a sectional view of a mechanical component according to a fourth embodiment of the present invention.

FIG. 9 is a sectional view of the timepiece component 40. In the following, the portions common to the above embodiments are indicated by the same reference numerals, and a description thereof will be left out.

As shown in FIG. 9, the timepiece component 40 is of the same construction as the timepiece component 20 of the second embodiment except that oil repellent films 34 through 37 are formed.

In the region of an outer peripheral surface 23b of the small-diameter portion 23 adjacent to the outer peripheral surface 27a where the oil retaining film 31 is formed (hereinafter referred to as a first adjacent region 23c), there is formed the oil repellent film 34. The oil repellent film 34 is less lipophilic than the formation surface (the first adjacent region 23c).

The first adjacent region 23c is adjacent to the outer peripheral surface 27a over the entire periphery of the small-diameter portion 23. Thus, the oil repellent film 34 is adjacent to the oil retaining film 31 over the entire periphery of the small-diameter portion 23. The region where the oil repellent film 34 is formed (the first adjacent region 23c) may be all of the region of the outer peripheral surface 23b of the small-diameter portion 23 where the oil retaining film 31 is not formed, or a part of the region.

On a first surface 25a of the surface of the hole jewel 25, there is formed the oil repellent film 35. The oil repellent film 35 is less lipophilic than the formation surface (the first surface 25a).

The first surface 25a is an example of the second adjacent region adjacent to the inner peripheral surface 24a where the oil retaining film 32 is formed. The first surface 25a is a region adjacent to the inner peripheral surface 24a over the entire periphery of the hole jewel 25. Thus, the oil repellent film 35 is adjacent to the oil retaining film 32 over the entire periphery of the hole jewel 25. The oil repellent film 35 may be formed on the entire first surface 25a or it may be formed in a part of the region.

Of the surface of the hole jewel 25, on a second surface 25b which is a surface opposite the first surface 25a, there is formed the oil repellent film 36. The oil repellent film 36 is less lipophilic than the formation surface (the second surface 25b).

The second surface 25b is another example of the second adjacent region adjacent to the inner peripheral surface 24a where the oil retaining film 32 is formed. The second surface 25b is region adjacent to the inner peripheral surface 24a over the entire periphery of the hole jewel 2. Thus, the oil repellent film 36 is adjacent to the oil retaining film 32 over the entire periphery of the hole jewel 25. The oil repellent film 36 may be formed on the entire second surface 25b or it may be formed on a part of the region.

Of an opposing surface 26a of the large-diameter portion 26, in the region adjacent to the outer peripheral surface 23b of the small-diameter portion 23 (an outer peripheral region 26c), there is formed the oil repellent film 37. The oil repellent film 37 is less lipophilic than the formation surface (the outer peripheral region 26c).

The material, etc. of the oil repellent films 34 through 37 may be the same as those of the oil repellent films 14 through 17 of the third embodiment.

The timepiece component 40 has the oil retaining films 31 and 32, so that outflow of the lubricating oil 8 does not take place easily. Thus, as in the case of the timepiece 30 of the third embodiment, it is possible to perform a stable operation for a long period of time.

The timepiece component 40 has the oil repellent films 34 through 37 adjacent to the oil retaining films 31 and 32, so that the lubricating oil 8 hardly flows out of the surface of the oil retaining films 31 and 32. Thus, it is possible to further enhance the oil retaining performance of the oil retaining films 31 and 32. Thus, it is possible to perform a stable operation for a long period of time.

Fifth Embodiment

Figure 10:
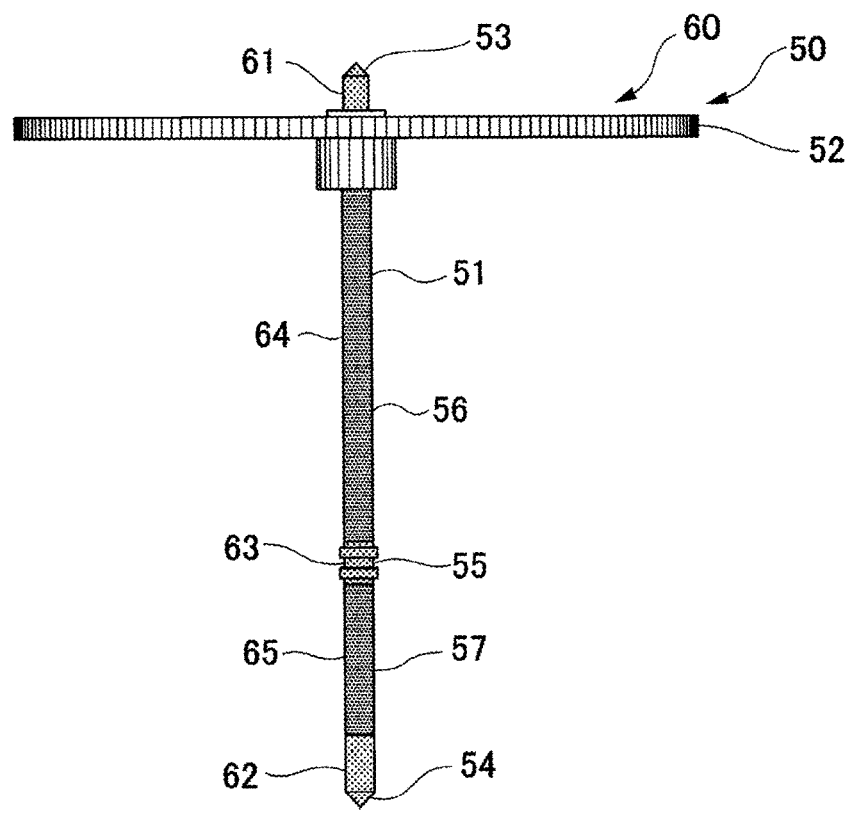
FIG. 10 is a side view of a mechanical component according to a fifth embodiment of the present invention.
Figure 11:
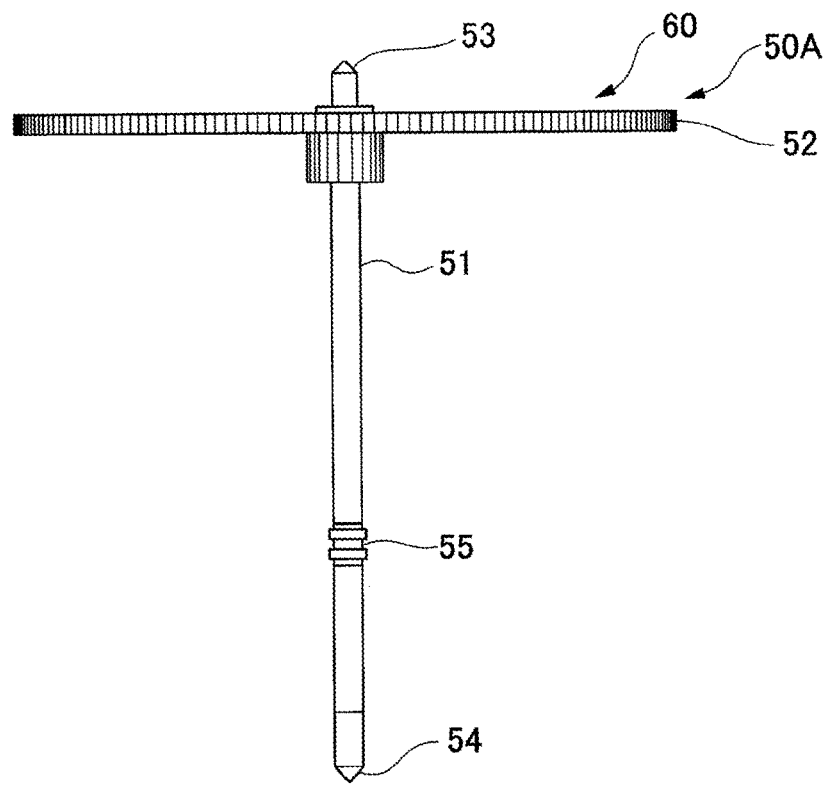
FIG. 11 is a side view of the mechanical component in the state before the formation of an oil retaining film and an oil repellent film.
Figure 12:
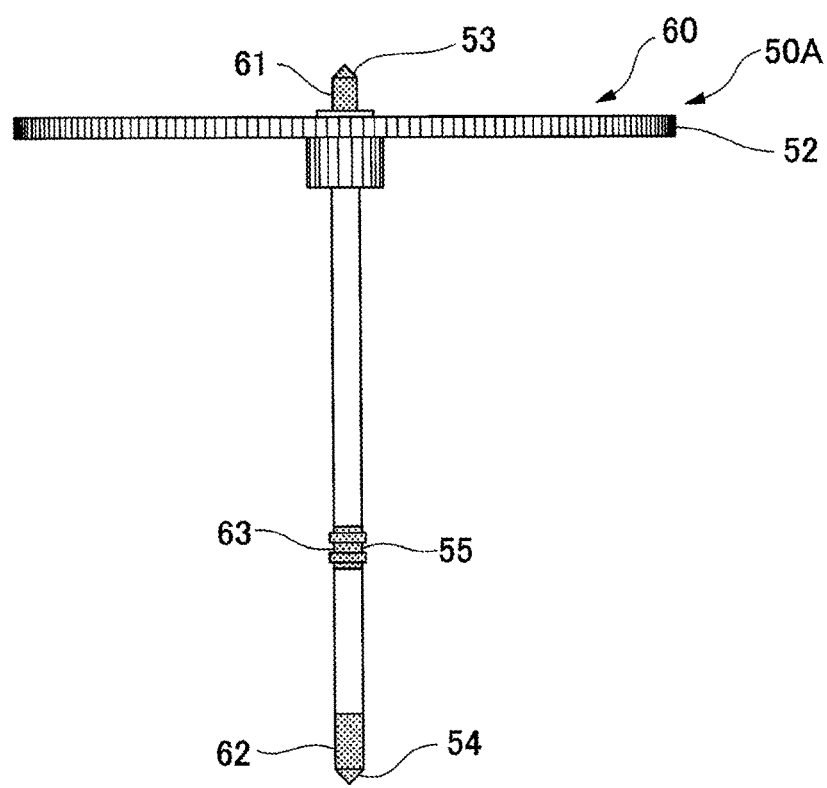
FIG. 12 is a side view of the mechanical component on which the oil retaining film has been formed.

A timepiece component 50 (mechanical component) according to the fifth embodiment of the present invention will be described with reference to FIGS. 10 through 12. FIG. 10 is a side view of the timepiece component 50 according to the fifth embodiment of the present invention. FIG. 11 is a side view of a timepiece component 50A in the state before the formation of the oil retaining film and the oil repellent film. FIG. 12 is a side view of the timepiece component 50A with the oil retaining film formed thereon.

As shown in FIG. 10, the timepiece component 50 is equipped with a cogwheel 60 (first component) and a bearing (second component) (not shown).

The cogwheel 60 is equipped with a shaft portion 51 and a cogwheel portion 52 fixed to the shaft portion 51.

A first end portion 53 (first tenon portion) and a second end portion 54 (second tenon portion) of the shaft portion 51 are rotatably supported by the bearing (second component). There is the possibility of the outer peripheral surfaces (first surface region) of the first end portion 53 and the second end portion 54 sliding on the inner peripheral surface of the bearing (second surface region). There is the possibility of the outer peripheral surface (first surface region) of an intermediate portion 55 (intermediate portion in the length direction) of the shaft portion 51 sliding on the inner peripheral surface (second surface region) of a cannon pinion (not shown).

On the outer peripheral surfaces of the first end portion 53, the second end portion 54, and the intermediate portion 55 of the shaft portion 51, there are respectively formed oil retaining films 61, 62, and 63. The material, etc. of the oil retaining films 61 through 63 may be the same as those of the oil retaining films 11 through 13 of the first embodiment.

Of the outer peripheral surface of the shaft portion 51, in a first intermediate region 56 (first adjacent region) between the first end portion 53 and the intermediate portion 55, and in a second intermediate region 57 (second adjacent region) between the intermediate region 55 and the second end portion 54, there are respectively formed oil repellent films 64 and 65. The material, etc. of the oil repellent films 64 and 65 may be the same as those of the oil repellent films 14 through 17 of the third embodiment.

Examples of the bearing (second component) supporting the first end portion 53 and the second end portion 54 include the same construction as that of the bearing 2 shown in FIG. 1, etc.

The timepiece component 50 can be prepared, for example, in the following manner.

As shown in FIGS. 11 and 12, the oil retaining films 61, 62, and 63 are respectively formed on the outer peripheral surfaces of the first end portion 53, the second end portion 54, and the intermediate portion 55 of the timepiece component 50A where no oil retaining films 61 through 63 and no oil repellent films 64 and 65 are formed.

The oil retaining films 61 and 62 can be formed, for example, by applying an oil retaining processing agent to the first end portion 53 and the second end portion 54 through dipping, and drying the agent.

The oil retaining film 63 can be formed, for example, by applying an oil retaining processing agent to the intermediate portion 55 by brushing or the like, and drying the agent.

Next, the entire timepiece component 50A with the oil retaining films 61 through 63 formed thereon is immersed in an oil repelling processing agent, whereby the oil repelling processing agent is applied to the first intermediate region 56 and the second intermediate region 57. By drying the oil repelling processing agent, there are formed oil repellent films 64 and 65. As a result, there is obtained the timepiece component 50 shown in FIG. 10.

In the timepiece component 50, which has the oil retaining films 61 through 63, outflow of the lubricating oil does not easily take place. Thus, it is possible to perform a stable operation for a long period of time.

In the timepiece component 50, which has the oil repellent films 64 and 65 adjacent to the oil retaining films 61 through 63, the lubricating oil does not easily flow out of the surface of the oil retaining films 61 through 63. Thus, it is possible to further enhance the oil retaining performance of the oil retaining films 61 through 63.

Sixth Embodiment (Mechanical Timepiece)

Figure 13:
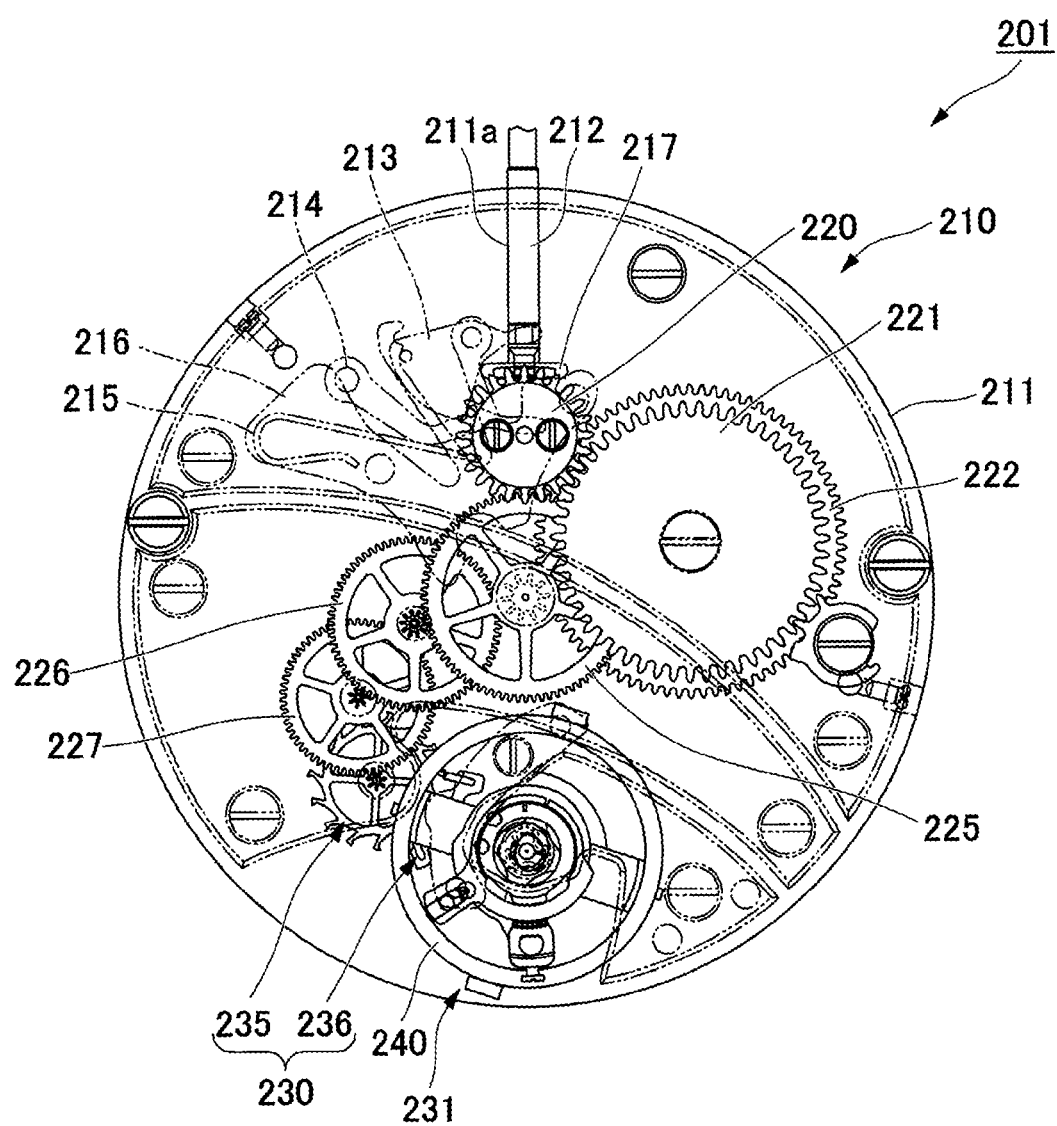
FIG. 13 is a front side plan view of a movement capable of using a mechanical component according to an embodiment.

A mechanical timepiece 201 employing an escapement mechanism, which is a timepiece component (mechanical component) according to the sixth embodiment of the present invention, will be described. FIG. 13 is a front side plan view of a movement.

As shown in FIG. 13, the mechanical timepiece 201 is composed of a movement 210 and a casing (not shown) accommodating this movement 210.

The movement 210 has a main plate 211 constituting a base plate. On the back side of this main plate 211, there is arranged a dial (not shown). A train wheel incorporated into the front side of the movement 210 is referred to as the front train wheel, and a train wheel incorporated into the back side of the movement 210 is referred to as the back train wheel.

Formed in the main plate 211 is a winding stem guide hole 211a, into which a winding stem 212 is rotatably incorporated. The axial position of the winding stem 212 is determined by a switching device having a setting lever 213, a yoke 214, a yoke spring 215, and a setting lever jumper 216. Further, the guide shaft portion of the winding stem 212 is rotatably provided with a winding pinion 217.

When the winding stem 212 is rotated in the state in which the winding stem 212 is at a first winding stem position ($0^{th}$ step) nearest to the inner side of the movement 210 along the rotation axis direction, the winding pinion 217 rotates through the rotation of a clutch wheel (not shown). Through the rotation of this winding pinion 217, a crown wheel 220 in mesh therewith rotates. Through the rotation of this crown wheel 220, a ratchet wheel 221 in mesh therewith rotates. Further, through the rotation of this ratchet wheel 221, a mainspring (power source) (not shown) accommodated in a movement barrel 222 is wound up.

Apart from the above-mentioned movement barrel 222, the front train wheel of the movement 210 is formed by a center wheel & pinion 225, a third wheel & pinion 226, and a second wheel & pinion 227, and has a function by which it transmits the rotational force of the movement barrel 222. Further, on the front side of the movement 210, there are arranged an escapement mechanism 230 and a governor mechanism 231 for controlling the rotation of the front train wheel.

The center wheel & pinion 225 is formed as a cogwheel in mesh with the movement barrel 222. The third wheel & pinion 226 is formed as a cogwheel in mesh with the center wheel & pinion 225. The second wheel & pinion 227 is formed as a cogwheel in mesh with the third wheel & pinion 226.

The governor mechanism 231 is a mechanism governing the escapement mechanism 230, and is equipped with a balance with hairspring 240.

(Escapement Mechanism)

The escapement mechanism 230 is a mechanism controlling the rotation of the above-mentioned front train wheel, and is equipped with an escape wheel & pinion 235 (first component) in mesh with the second wheel & pinion 227, and a pallet fork 236 (second component) causing the escape wheel & pinion 235 to escape and regularly rotate. The escapement mechanism 230 is a timepiece component (mechanical component) according to the sixth embodiment of the present invention.

Figure 14:
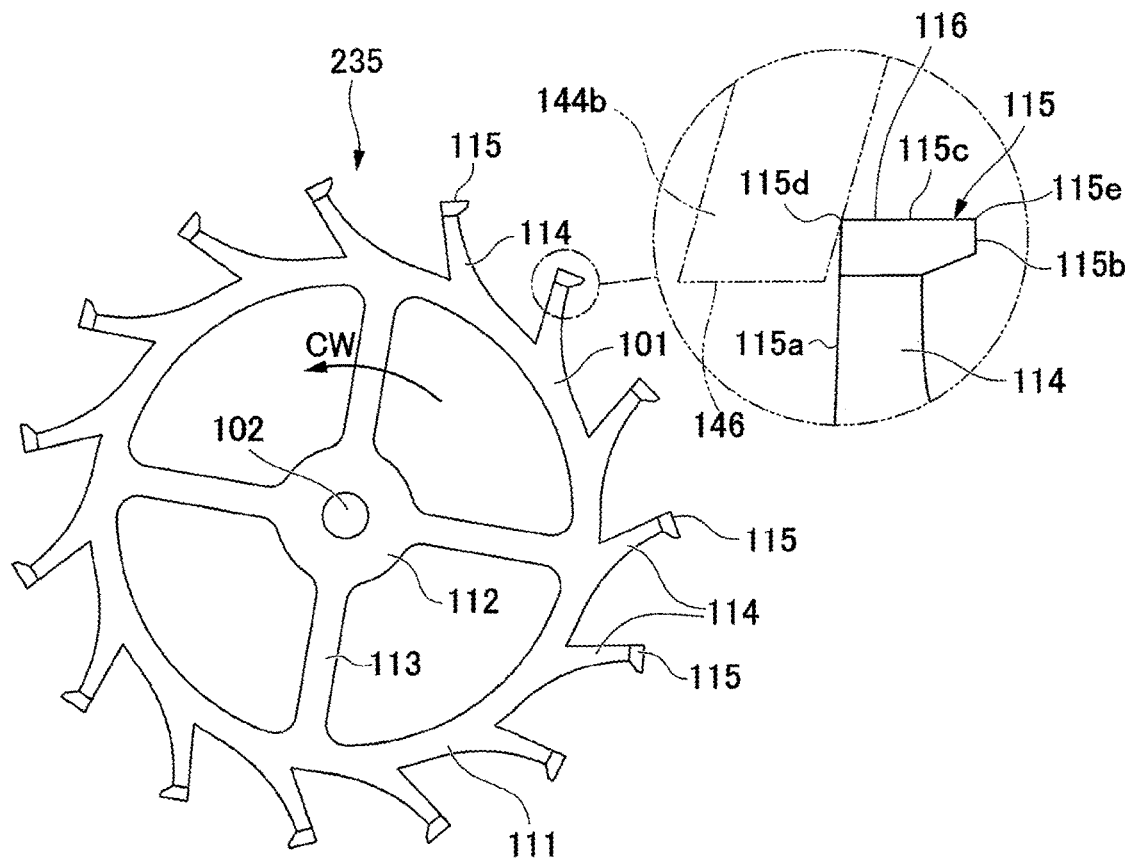
FIG. 14 is a plan view of a first component of a mechanical component according to a sixth embodiment of the present invention.
Figure 15:
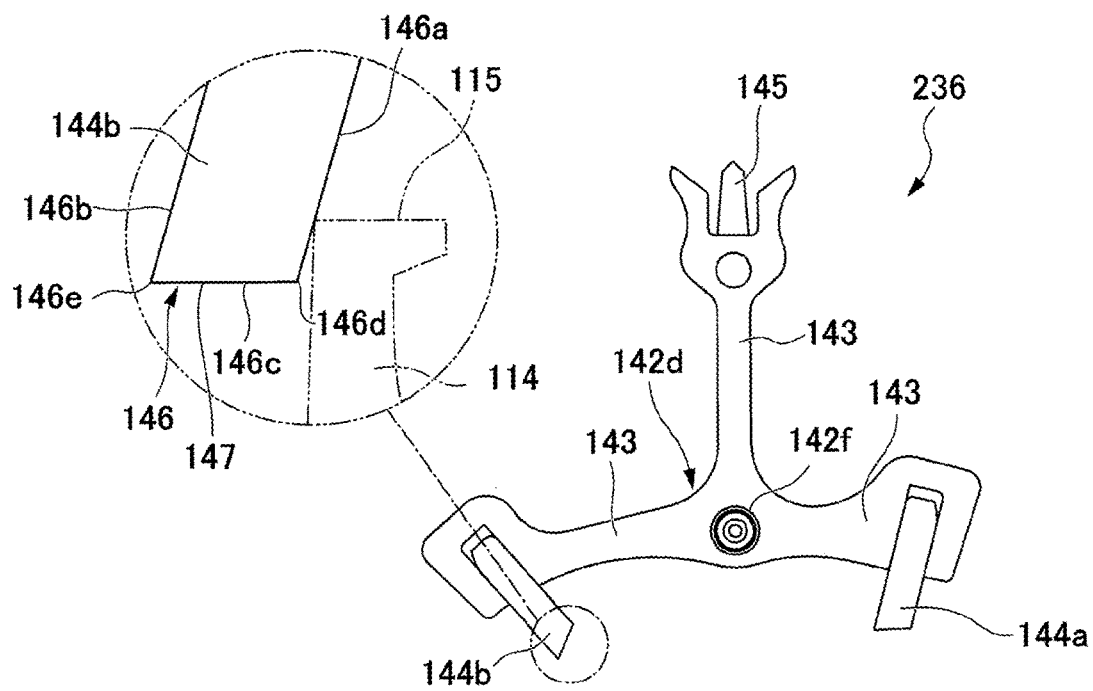
FIG. 15 is a plan view of a second component of a mechanical component according to the sixth embodiment.

FIG. 14 is a plan view of the escape wheel & pinion 235. FIG. 15 is a plan view of the pallet fork 236. As shown in FIG. 14, the escape wheel & pinion 235 is equipped with an escape cogwheel portion 101 and a shaft member 102 coaxially fixed to the escape cogwheel portion 101. The direction orthogonal to the axis of the shaft member 102 will be referred to as the radial direction. In FIG. 14, the rotational direction of the escape wheel & pinion 235 is indicated by symbol CW.

The escape cogwheel portion 101 has an annular rim portion 111, a hub portion 112 arranged on the inner side of the rim portion 111, and a plurality of spoke portions 113 connecting the rim portion 111 and the hub portion 112. The hub portion 112 is of a circular plate-like configuration, and the shaft member 102 is fixed to the central portion thereof through forcing-in or the like. Each spoke portion 113 extends radially from the outer peripheral edge of the hub portion 112 toward the inner peripheral edge of the rim portion 111.

A plurality of tooth portions 114 formed in a special hook-like configuration protrude radially outwards from the outer peripheral surface of the rim portion 111. Pallets 144a and 144b (See FIG. 15) of the pallet fork 36 described below are in mesh with the distal end portions of the plurality of tooth portions 114.

The side surface of the distal end portion of each tooth portion 114 has a stop surface 115a situated on the downstream side in the rotational direction CW of the escape wheel & pinion 235 and configured to abut the pallets 144a and 144b, a back surface 115b situated on the upstream side in the rotational direction CW, and a shock surface 115c which is the distal end surface of the tooth portion 114.

The corner portion formed by the stop surface 115a and the shock surface 115c functions as a rocking corner 115d. The corner portion formed by the back surface 115b and the shock surface 115c functions as a leaving corner 115e.

Of the tooth portion 114, the range from the stop surface 115a to the leaving corner 115e via the rocking corner 115d constitutes a sliding surface 115 (first surface region).

An oil retaining film 116 is formed on the sliding surface 115. The material, etc. of the oil retaining film 116 may be the same as those of the oil retaining films 11 through 13 of the first embodiment.

Of the surface of the escape wheel & pinion 235, in at least the region adjacent to the sliding surface 115, there may be formed an oil repellent film similar to the oil repellent films 14 through 17 of the third embodiment.

As shown in FIG. 15, the pallet fork 236 is equipped with a body of pallet fork 142d formed in a T-shaped configuration by three pallet beams 143, and a pallet staff 142f. The body of pallet fork 142d is rotatable by the pallet staff 142f which is a shaft. Both ends of the pallet staff 142f are rotatably supported with respect to the above-mentioned main plate 211 and a pallet bridge (not shown), respectively. The rotational range of the pallet fork 236 is regulated by a banking pin (not shown).

Of the three pallet beams 143, two pallet beams 143 are provided with pallets (entry pallet 144a and exit pallet 144b) at the distal ends thereof, and mounted to the distal end of the remaining one pallet beam 143 is a pallet box 145 detachably attachable with a double roller (not shown) of the balance with hairspring 240. The pallets (entry pallet 144a and exit pallet 144b) consist of ruby formed into a prism-like configuration, and are bonded and fixed to the pallet beams 143 by adhesive or the like.

The distal end portion of the exit pallet 144b has a stop surface 146a situated on the upstream side in the rotational direction CW of the escape cogwheel portion 101 and configured to abut the stop surface 115a of the tooth portion 114, a back surface 146b situated on the downstream side in the rotational direction CW, and a shock surface 146c which is the distal end surface of the exit pallet 144b.

The corner portion formed by the stop surface 146a and the shock surface 146c functions as a rocking corner 146d. The corner portion formed by the back surface 146b and the shock surface 146c functions as a leaving corner 146e.

The range of the exit pallet 144b extending from the stop surface 146a to the leaving corner 146e via the rocking corner 146d constitutes a sliding surface 146 (second surface region).

Of the pallets 144a and 144b, the construction of the distal end portion of the entry pallet 144a is the same as the construction of the distal end portion of the exit pallet 144b, so a description thereof will be left out.

An oil retaining film 147 is formed on the sliding surface 146. The material, etc. of the oil retaining film 147 may be the same as those of the oil retaining films 11 through 13 of the first embodiment.

Of the surface of the pallets 144a and 144b, in at least the region adjacent to the sliding surface 146, an oil repellent film similar to the oil repellent films 14 through 17 of the third embodiment may be formed.

The escapement mechanism 230, which has the oil retaining films 116 and 147, is little subject to outflow of the lubricating oil. Thus, it is possible to perform a stable operation for a long period of time.

In the case where there is formed an oil repellent film adjacent to the oil retaining films 116 and 147, it is possible to further enhance the oil retaining performance of the oil retaining films 116 and 147.

(Mechanism Module)

A unit which is a part of the movement 210 shown in FIG. 13, and which is equipped, for example, with the escapement mechanism 230 (See FIG. 13), the bearing (not shown) of the shaft member 102 (See FIG. 14) of the escape wheel & pinion 235, and the bearing (not shown) of the pallet staff 142f (See FIG. 15) of the pallet fork 236 is an example of the "mechanism module."

Other examples of the mechanism module include a unit equipped with the movement barrel 222, the center wheel & pinion 225, the third wheel & pinion 226, the second wheel & pinion 227 (See FIG. 13), and the bearings thereof (not shown).

The mechanism module may be a gear box or the like used in an analog quartz type timepiece.

Seventh Embodiment

Figure 16:
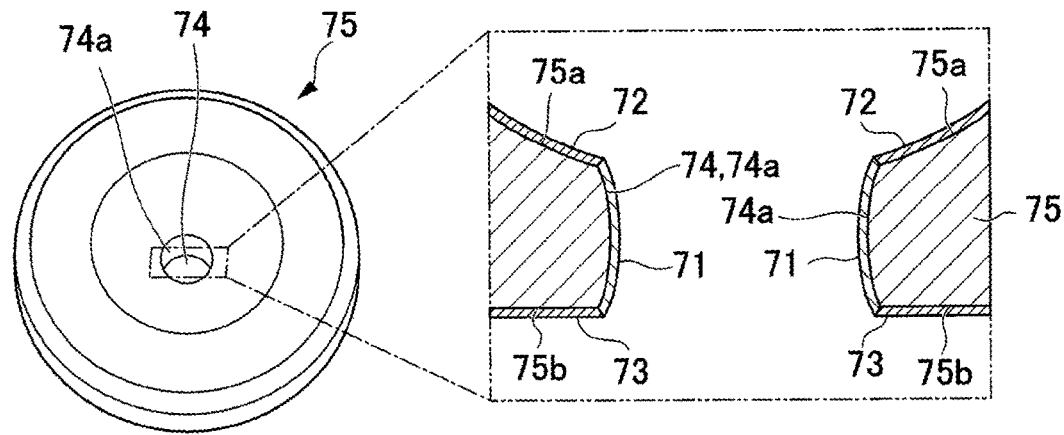
FIG. 16 is a perspective view and a sectional view of a part of a mechanical component according to a seventh embodiment of the present invention.

FIG. 16 is a perspective view and a sectional view of a hole jewel 75 constituting the bearing (second component) of a timepiece component (mechanical component) according to the seventh embodiment of the present invention.

The hole jewel 75 is formed, for example, in a circular configuration in plan view. The hole jewel 75 has a through-hole 74.

The through-hole 74 is formed, for example, at the center of the hole jewel 75 in plan view. The through-hole 74 is formed, for example, in a circular configuration in plan view. For example, the tenon portion of a shaft body (first component) is inserted into the through-hole 74. The shaft body (first component) is formed, for example, in the same construction as that of the shaft body 1 shown in FIG. 1, etc.

An oil retaining film 71 is formed on an inner peripheral surface 74a (second surface region) of the through-hole 74 of the hole jewel 75. The oil retaining film 71 may be of the same construction as that of the oil retaining films 11 through 13 of the first embodiment.

Oil repellent films 72 and 73 are respectively formed on a first surface 75a and a second surface 75b of the hole jewel 75. The oil repellent films 72 and 73 may be of the same construction as that of the oil repellent films 14 through 17 in the third embodiment.

In the above timepiece component, the hole jewel 75 has the oil retaining film 71, so that outflow of the lubricating oil does not easily take place. Thus, it is possible to perform a stable operation for a long period of time.

The above timepiece component has the oil repellent films 72 and 73 adjacent to the oil retaining film 71, so that it is possible to further enhance the oil retaining performance of the oil retaining film 71.

Eighth Embodiment

Figure 17:
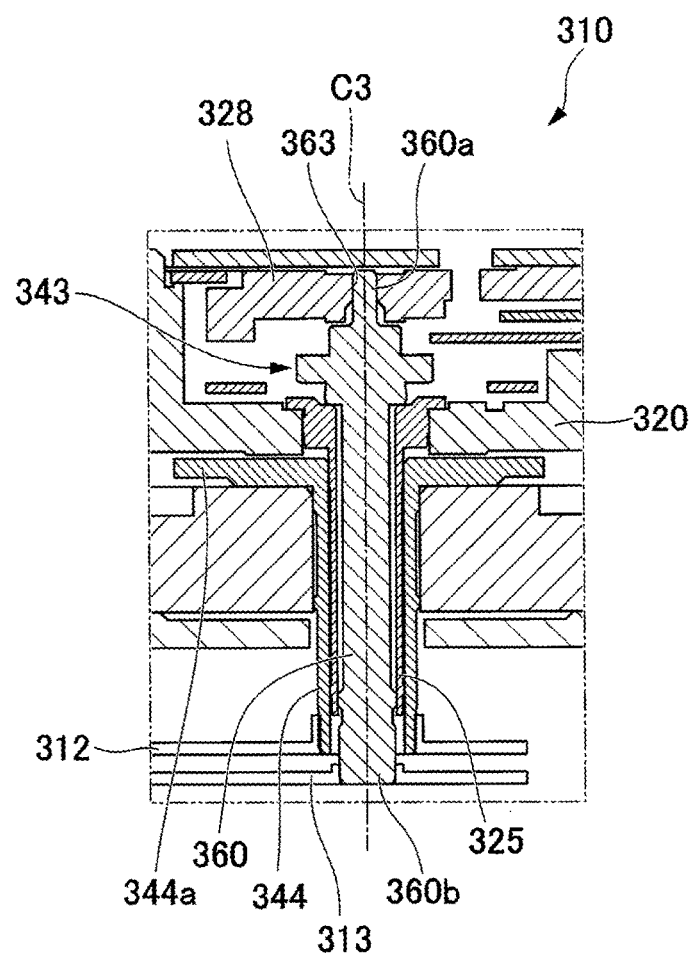
FIG. 17 is a sectional view of a part of a movement employing a mechanical component according to an eighth embodiment of the present invention.

A timepiece component (mechanical component) according to the eighth embodiment of the present invention will be described. FIG. 17 is a sectional view of a part of a movement 310 employing the timepiece component (mechanical component) of the eighth embodiment.

The movement 310 is equipped with a center wheel & pinion 343, a minute wheel (not shown) rotating based on the rotation of the center wheel & pinion 343, and an hour wheel 344 rotating based on the rotation of the minute wheel.

The center wheel & pinion 343 has an axle 360. The axle 360 extends coaxially with a center axis C3, and is rotatably inserted into a center pipe 325. The center pipe 325 extends coaxially with the center axis C3, and is retained by a main plate 320.

An upper end portion 360a of the axle 360 is rotatably supported by a tenon frame 363 arranged in a train wheel bridge 328. A lower end portion 360b of the axle 360 protrudes downwards further than the center pipe 325. A minute hand 313 is mounted to the lower end portion 360b of the axle 360.

The hour wheel 344 is arranged coaxially with the center axis C3 of the center wheel & pinion 343, and is rotatably fitted onto the center pipe 325. The hour wheel 344 has an hour cogwheel 344a in mesh with the center wheel & pinion 343 via the minute wheel (not shown), etc. An hour hand 312 is mounted to the lower end portion of the hour wheel 344.

The center wheel & pinion 343, the center pipe 325, and the hour wheel 344 constitute the timepiece component (mechanical component) of the eighth embodiment of the present invention.

The center wheel & pinion 343 is a first example of the first component. The center pipe 325 is an example of the second component. The axle 360 of the center wheel & pinion 343 rotates with respect to the center pipe 325, so that there is the possibility of the outer peripheral surface of the axle 360 (first surface region) sliding on the inner peripheral surface of the center pipe 325 (second surface region).

It is possible to form an oil retaining film of the same construction as that of the first oil retaining film 11 of the first embodiment (See FIG. 1) on a part or the whole of the outer peripheral surface of the axle 360 of the center wheel & pinion 343.

It is possible to form an oil retaining film of the same construction as that of the second oil retaining film 12 of the first embodiment (See FIG. 1) on a part or the whole of the inner peripheral surface of the center pipe 325.

The hour wheel 344 is a second example of the first component. The hour wheel 344 rotates with respect to the center pipe 325, so that there is the possibility of the inner peripheral surface of the hour wheel 344 (first surface region) sliding on the outer peripheral surface of the center pipe 325 (second surface region).

It is possible to form an oil retaining film of the same construction as that of the first oil retaining film 11 of the first embodiment (See FIG. 1) on a part or the whole of the inner peripheral surface of the hour wheel 344.

It is possible to form an oil retaining film of the same construction as that of the second oil retaining film 12 of the first embodiment (See FIG. 1) on a part or the whole of the outer peripheral surface of the center pipe 325.

In the above timepiece component, which has the oil retaining film, outflow of the lubricating oil does not easily take place. Thus, it is possible to perform a stable operation for a long period of time.

The present invention is not restricted to the above-described embodiments but includes various modifications of the embodiments without departing from the scope of the gist of the present invention. That is, the specific configurations, constructions, etc. as mentioned in the embodiments are only given by way of example, and allow modifications as appropriate.

For example, while in the timepiece component 10, etc. of the first embodiment shown in FIG. 1 the oil retaining film is formed on both the shaft body 1 (first component) and the bearing 2 (second component), it is only necessary for the oil retaining film to be formed on at least one of the first component and the second component. For example, the timepiece component 10 shown in FIG. 1 may adopt a construction which has only one of the first oil retaining film 11 and the second oil retaining film 12.

While in the timepiece component 10 shown in FIG. 1 the oil retaining film 11 is formed on the outer peripheral surface 7a of the inserted portion 7 (first surface region), it is only necessary for the oil retaining film to be formed at least in the first surface region. It may also be formed over a range larger than the first surface region of the surface of the first component. Further, the oil retaining film may be formed not over the entire region of the first surface region but solely on a part thereof.

Similarly, while in the timepiece component 10 shown in FIG. 1 the second oil retaining film 12 is formed on the inner peripheral surface 4a of the through-hole 4 (second surface region), it is only necessary for the oil retaining film to be formed at least in the second surface region. It may also be formed over a range larger than the second surface region of the surface of the second component. Further, the oil retaining film may be formed not over the entire region of the second surface region but solely on a part thereof.

While in the timepiece component 30, etc. of the third embodiment shown in FIG. 8 the oil repellent film is formed adjacent to the oil retaining film, the oil repellent film may be adjacent to the oil retaining film with a gap therebetween.

In the above mechanical component, it is only necessary for the first component and the second component to be slidable with respect to each other. That is, the first component may slide on the second component, or the second component may slide on the first component. Further, both the first component and the second component may operate, whereby they slide on each other.

Figure 18:
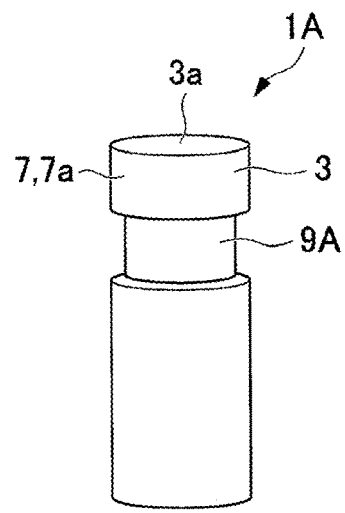
FIG. 18 is a schematic view illustrating a first modification of a shaft body of the mechanical component shown in FIG. 1.

FIG. 18 is a schematic view illustrating a first modification of the shaft body 1 (See FIG. 1). As shown in FIG. 18, a recess 9A is formed in the outer peripheral surface 7a of the inserted portion 7 of the tenon portion 3 of a shaft body 1A. The recess 9A is an annular groove extending around the axis of the shaft body 1A. The sectional configuration of the recess 9A (the configuration of the section passing through the center axis of the shaft body 1A) is rectangular. The first oil retaining film is formed on at least the outer peripheral surface 7a, the inner surface of the recess 9A, and the distal end surface 3a of the tenon portion 3.

Figure 19:
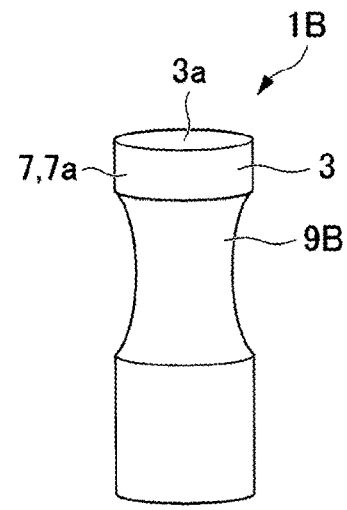
FIG. 19 is a schematic view illustrating a second modification of the shaft body of the mechanical component shown in FIG. 1.

FIG. 19 is a schematic view illustrating a second modification of the shaft body 1. A shaft body 1B shown in FIG. 19 is different from the shaft body 1A of the first modification (See FIG. 18) in that the sectional configuration of a recess 9B (the configuration of the section passing through the center axis of the shaft body 1B) is arcuate. The first oil retaining film is formed on at least the outer peripheral surface 7a, the inner surface of the recess 9B, and the distal end surface 3a of the tenon portion 3. In this shaft body 1B, the recess 9B is of an arcuate sectional configuration, so that a force in a bending direction is not easily concentrated at the portion where the recess 9B is formed. Thus, the shaft body 1B is little subject to failure.

Figure 20:
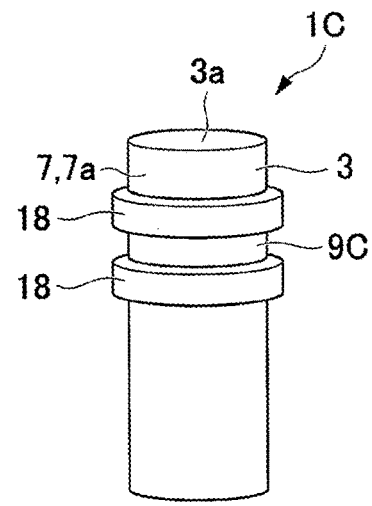
FIG. 20 is a schematic view illustrating a third modification of the shaft body of the mechanical component shown in FIG. 1.

FIG. 20 is a schematic view illustrating a third modification of the shaft body 1. In a shaft body 1C shown in FIG. 20, a pair of annular protrusions 18 are formed on the outer peripheral surface 7a at an interval in the axial direction of the shaft body 1C. The sectional configuration of the annular protrusions 18 (the configuration of the section passing through the center axis of the shaft body 1C) is rectangular. The interval between the two annular protrusions 18 is a recess 9C. The sectional configuration of the recess 9C (the configuration of the section passing through the center axis of the shaft body 1C) is rectangular. The first oil retaining film is formed on at least the outer peripheral surface 7a, the outer surfaces of the annular protrusions 18, the inner surface of the recess 9C, and the distal end surface 3a of the tenon portion 3.

Figure 21:
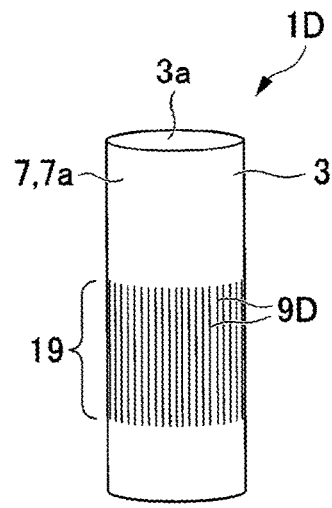
FIG. 21 is a schematic view illustrating a fourth modification of the shaft body of the mechanical component shown in FIG. 1.

FIG. 21 is a schematic view illustrating a fourth modification of the shaft body 1. In a shaft body 1D shown in FIG. 21, there are formed, in an annular region 19 constituting a part of the outer peripheral surface 7a, a plurality of groove-like recesses 9D extending along the center axis at intervals around the axis. The groove-like recesses 9D are formed continuously from one end in the center axis direction of the annular region 19 to the other end thereof.

Figure 22:
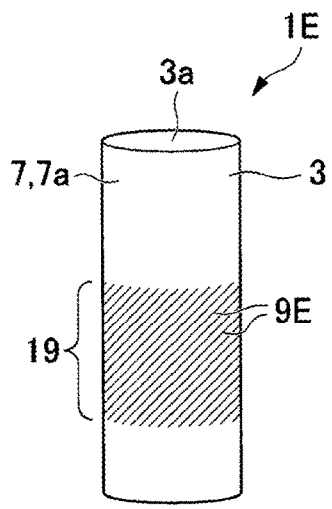
FIG. 22 is a schematic view illustrating a fifth modification of the shaft body of the mechanical component shown in FIG. 1.

FIG. 22 is a schematic view illustrating a fifth modification of the shaft body 1. A shaft body 1E shown in FIG. 22 has a plurality of groove-like recesses 9E. The shaft body 1E is different from the shaft body 1D shown in FIG. 21 in that the groove-like recesses 9E are inclined with respect to the center axis direction. The inclination angle of the groove-like recesses 9E with respect to the center axis direction is more than 0° and less than 90°.

Figure 23:
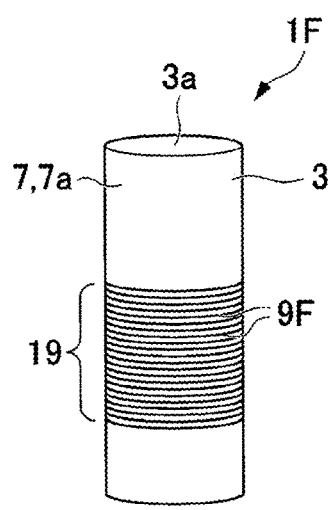
FIG. 23 is a schematic view illustrating a sixth modification of the shaft body of the mechanical component shown in FIG. 1.

FIG. 23 is a schematic view illustrating a sixth modification of the shaft body 1. A shaft body 1F shown in FIG. 23 has a plurality of groove-like recesses 9F. The shaft body 1F differs from the shaft body 1D shown in FIG. 21 in that the groove-like recesses 9F are of an annular configuration extending around the axis.

Figure 24:
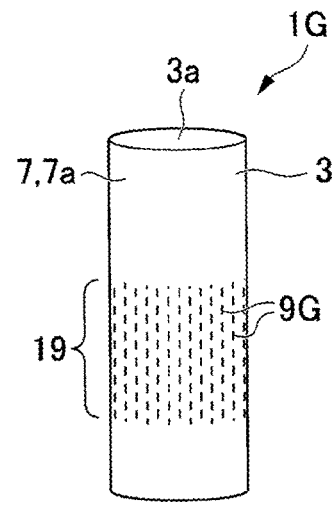
FIG. 24 is a schematic view illustrating a seventh modification of the shaft body of the mechanical component shown in FIG. 1.

FIG. 24 is a schematic view illustrating a seventh modification of the shaft body 1. In a shaft body 1G shown in FIG. 24, there are formed, in the annular region 19, a plurality of groove-like recesses 9G extending along the center axis direction. The groove-like recesses 9G are shorter as compared with the groove-like recesses 9D shown in FIG. 21.

Figure 25:
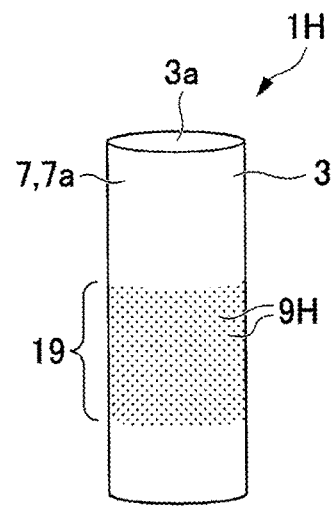
FIG. 25 is a schematic view illustrating an eighth modification of the shaft body of the mechanical component shown in FIG. 1.

FIG. 25 is a schematic view illustrating an eighth modification of the shaft body 1. In a shaft body 1H shown in FIG. 25, there are formed, in the annular region 19, a plurality of dotted recesses 9H so as to be spaced away from each other.

Figure 26:
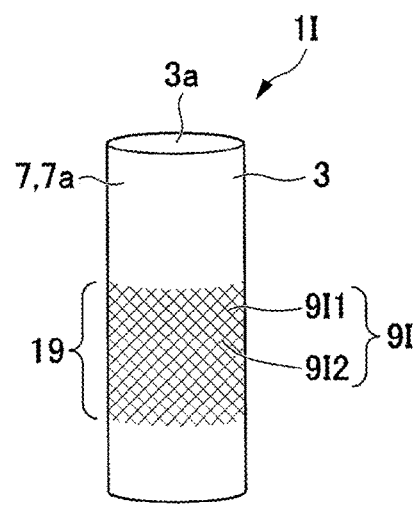
FIG. 26 is a schematic view illustrating a ninth modification of the shaft body of the mechanical component shown in FIG. 1.

FIG. 26 is a schematic view illustrating a ninth modification of the shaft body 1. In a shaft body 1I shown in FIG. 26, there are formed, in the annular region 19, lattice-like groove-like recesses 9I. The groove-like recesses 9I include a plurality of groove-like recesses 9I1 inclined with respect to the center axis direction, and a plurality of groove-like recesses 9I2 crossing the groove-like recesses 9I1.

In the shaft bodies 1A through 1I shown in FIGS. 21 through 26, the first oil retaining film is formed on at least the outer peripheral surface 7a, the inner surfaces of the groove-like recesses 9D through 9I, and the distal end surface 3a of the tenon portion 3.

The recesses 9A through 9I are retaining portions capable of retaining lubricating oil.

The recesses of the shaft body 1A through 1I shown in FIGS. 18 through 26 can be formed through cutting, transfer, laser processing, etc. The oil retaining film can be formed through the application of an oil retaining processing agent. The oil retaining processing agent permeates the recesses due to a capillary phenomenon, so that it is easy to selectively form the oil retaining film at the recesses.

In the shaft bodies 1A through 1I, even when the oil retaining film on the outer peripheral surface 7a is worn due to be sliding with respect to the bearing, the oil retaining film in the recesses 9A through 9I is not easily worn. Thus, the shaft bodies 1A through 1I retain lubricating oil, and can operate in a stable manner for a long period of time.

While the recesses 9D through 9G and 9I shown in FIGS. 21 through 24 and FIG. 26 are groove-like recesses formed in the outer peripheral surfaces 7a, the recesses may be ones formed by a plurality of ridges formed on the outer peripheral surface 7a (See the recess 9C of FIG. 20). The configurations shown in FIGS. 21 through 24 and FIG. 26 are also applicable to the recesses formed by the ridges.

It is desirable for the surface area of the inner surface of the recess to be large from the viewpoint of the oil retaining performance. For example, the recesses 9A are 9B shown in FIGS. 18 and 19 are of a single stage structure. Regarding the configuration of the recess, there may be adopted a configuration having one or a plurality of recesses at the bottom of the recess 9A, 9B, that is, that is a multi-stage structure. A recess of a multi-stage structure has a large inner surface area, so that it can easily retain lubricating oil. Thus, it is superior in terms of the oil retaining performance.

Examples of the shaft body also include a construction in which a plurality of dotted protrusions are formed on the outer peripheral surface 7a of the inserted portion 7. In the shaft body of this example, the space secured among the dotted protrusions constitutes a retaining portion capable of retaining the lubricating oil.

Figure 27:
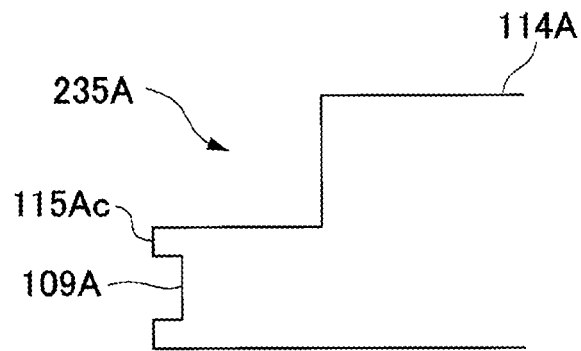
FIG. 27 is a configuration diagram illustrating a first modification of an escape wheel & pinion shown in FIG. 14.

FIG. 27 is a configuration diagram illustrating a first modification of the escape wheel & pinion 235 (See FIG. 14). More specifically, FIG. 27 is a side view of the distal end portion of a tooth portion 114A of an escape wheel & pinion 235A. As shown in FIG. 27, a recess 109A is formed at a shock surface 115Ac which is the distal end surface of the tooth portion 114A. The sectional configuration of the recess 109A (the configuration of the section taken along a plane parallel to the center axis of the escape wheel & pinion 235A and perpendicular to the shock surface 115Ac) is rectangular.

Figure 28:
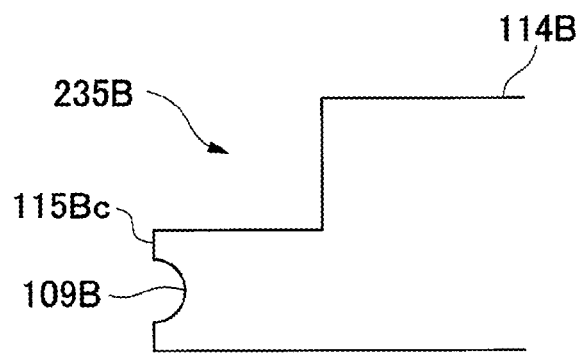
FIG. 28 is a configuration diagram illustrating a second modification of the escape wheel & pinion shown in FIG. 14.

FIG. 28 is a configuration diagram illustrating a second modification of the escape wheel & pinion 235 (See FIG. 14). More specifically, FIG. 28 is a side view of the distal end portion of a tooth portion 114B of an escape wheel & pinion 235B. As shown in FIG. 28, a recess 109B is formed at a shock surface 115Bc which is the distal end surface of the tooth portion 114B. The sectional configuration of the recess 109B (the configuration of the section taken along a plane parallel to the center axis of the escape wheel & pinion 235B and perpendicular to the shock surface 115Bc) is arcuate.

Figure 29:
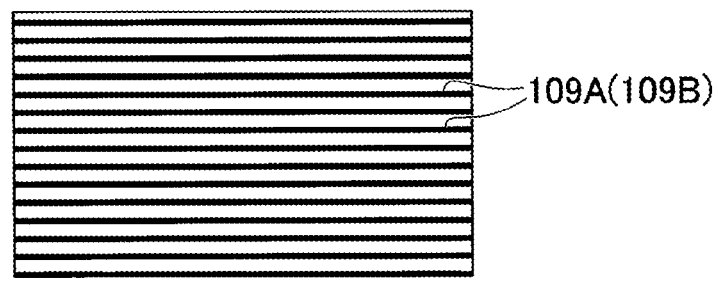
FIG. 29 is a schematic diagram illustrating a first example of the overall configuration of a recess.
Figure 3:
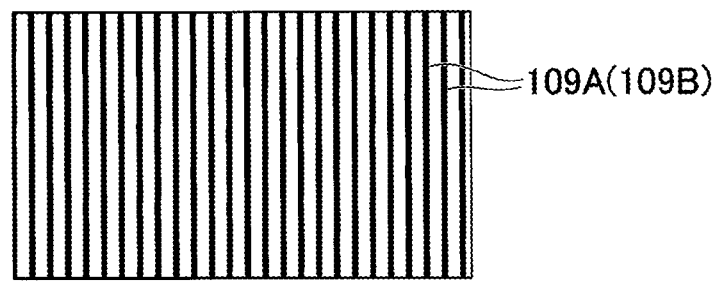
Figure 3:
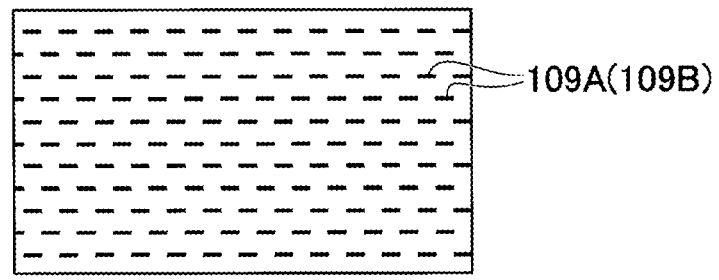
Figure 3:
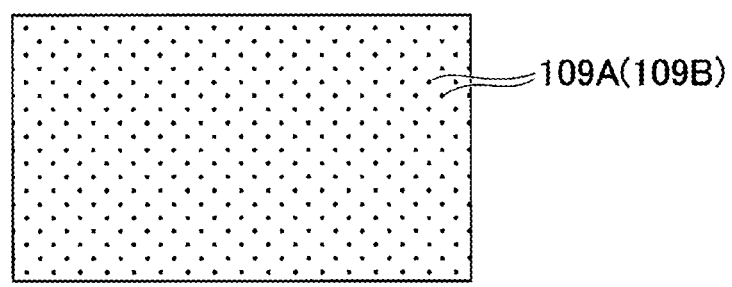

FIG. 29 is a schematic diagram illustrating a first example of the overall configuration of the recess 109A, 109B (See FIGS. 27 and 28). As shown in FIG. 29, a plurality of grove-like recesses 109A (or recesses 109B) are formed at the shock surface of the tooth portion of the escape wheel & pinion 235A, 235B (See FIGS. 27 and 28). The recesses 109A (or the recesses 109B) are of a groove-like configuration extending along the axis of the escape wheel & pinion 235A, 235B (See FIGS. 27 and 28). The recesses 109A (or the recesses 109B) are formed in the shock surface of the tooth portion from one end to the other end in the direction around the axis. In this structure, it is possible to suppress the sliding resistance of the escape wheel & pinion 235A, 235B at a low level.

FIG. 30 is a schematic diagram illustrating a second example of the overall configuration of the recesses 109A, 109B (See FIGS. 27 and 28). The plurality of recesses 109A (or recesses 109B) shown in FIG. 30 are of a groove-like configuration extending along the center axis direction of the escape wheel & pinion 235A, 235B.

FIG. 31 is a schematic diagram illustrating a third example of the overall configuration of the recesses 109A, 109B (See FIGS. 27 and 28). The plurality of recesses 109A (or recesses 109B) shown in FIG. 31 are of a groove-like configuration extending along the axis of the escape wheel & pinion 235A, 235B, and are shorter than the recesses shown in FIG. 29.

FIG. 32 is a schematic diagram illustrating a fourth example of the overall configuration of the recesses 109A, 109B (See FIGS. 27 and 28). The plurality of recesses 109A (or recesses 109B) shown in FIG. 32 are of a dotted configuration.

Figure 33:
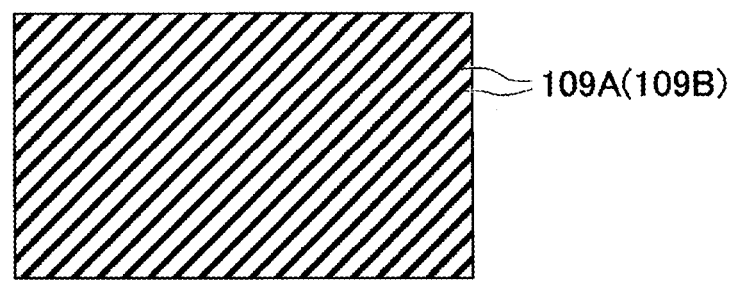
FIG. 33 is a schematic diagram illustrating a fifth example of the overall configuration of the recess.

FIG. 33 is a schematic diagram illustrating a fifth example of the overall configuration of the recesses 109A, 109B (See FIGS. 27 and 28). The plurality of groove-like recesses 109A (or recesses 109B) shown in FIG. 33 are different from the recesses shown in FIG. 29 in that they are formed so as to be inclined with respect to the direction around the axis. The inclination angle of the groove-like recesses with respect to the direction around the axis is more than 0° and less than 90°.

Figure 34:
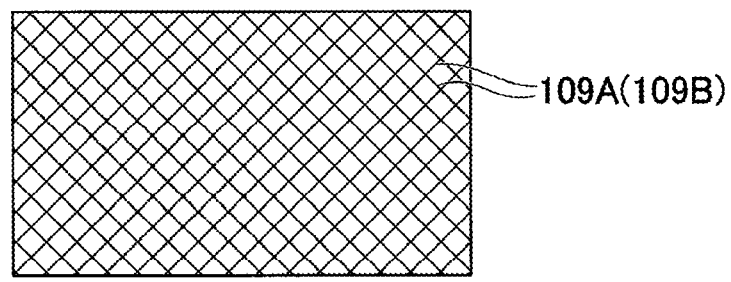
FIG. 34 is a schematic diagram illustrating a sixth example of the overall configuration of the recess.

FIG. 34 is a schematic diagram illustrating a sixth example of the overall configuration of the recesses 109A, 109B (See FIGS. 27 and 28). The groove-like recesses 109A (or recesses 109B) shown in FIG. 34 are formed in a lattice-like configuration.

The recesses shown in FIGS. 29 through 34 may be formed not only in the shock surface of the tooth portion but also over the entire sliding surface (the range extending from the stop surface to the leaving corner via the rocking corner).

Figure 35:
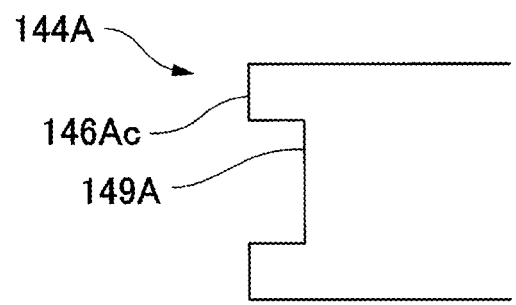
FIG. 35 is a configuration diagram illustrating a first modification of a pallet shown in FIG. 15.

FIG. 35 is a configuration diagram illustrating a first modification of the pallet (See FIG. 15). More specifically, FIG. 35 is a side view of the distal end portion of a pallet 144A (entry pallet and exit pallet). As shown in FIG. 35, a recess 149A is formed in a shock surface 146Ac which is the distal end surface of the pallet 144A. The sectional configuration of the recess 149A (the configuration of the section taken along a plane parallel to the center axis of the pallet fork and perpendicular to the shock surface 146Ac) is rectangular.

Figure 36:
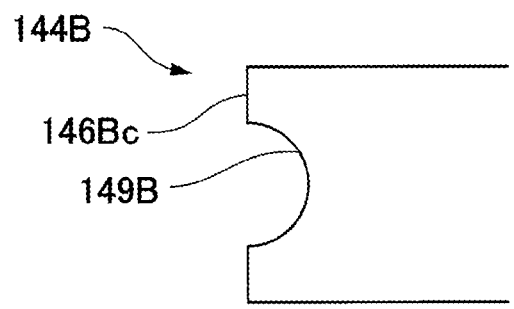
FIG. 36 is a configuration diagram illustrating a second modification of the pallet shown in FIG. 15.

FIG. 36 is a configuration diagram illustrating a second modification of the pallet (See FIG. 15). More specifically, FIG. 36 is a side view of the distal end portion of a pallet 144B (entry pallet and exit pallet). As shown in FIG. 36, a recess 149B is formed in a shock surface 146Bc which is the distal end surface of the pallet 144B. The sectional configuration of the recess 149B (the configuration of the section taken along a plane parallel to the center axis of the pallet fork and perpendicular to the shock surface 146Bc) is arcuate.

The overall configuration of the recess 149A, 149B may be one of the configurations shown in one of FIGS. 29 through 34. The recess 149A, 149B may be formed not only in the shock surface of the pallet 144A, 144B but also over the entire sliding surface (the range extending from the stop surface to the leaving corner via the rocking corner).

The recess can be formed by cutting, transfer, laser processing, etc.

An oil retaining film is formed on the sliding surface of the escape wheel & pinion 235A, 235B and that of the pallet 144A, 144B, and on the inner surface of the recess. The oil retaining film can be formed by applying an oil retaining processing agent. The oil retaining processing agent permeates the recess by a capillary phenomenon, so that the oil retaining film can be easily formed selectively at the recess.

In the escape wheel & pinion 235A, 235B and the pallet 144A, 144B, the oil retaining film at the recess is little subject to wear even when the oil retaining film on the sliding surface is worn. Thus, it is possible to retain the lubricating oil and to perform a stable operation for a long period of time.

The oil retaining film may be applied, for example, to the side surface of the teeth of a date indicator, the side surface of a jumper or the like, the inner wall of a barrel drum, etc. It is only necessary for the retaining portion (recess) to be formed in at least one of the first surface region of the first component and the second surface region of the second component. The configuration of the retaining portion is not restricted to the recessed one so long as it is capable of retaining lubricating oil.

What is claimed is:

1. A mechanical component comprising:
   a first component having a first surface region;
   a second component having a second surface region on which the first surface region can slide; and
   an oil retaining film on at least one of the first surface region and the second surface region and more lipophilic than the at least one surface region; and
   wherein the oil retaining film contains a chemical compound expressed by the following formula (1):

(1)

($M_1$ is one of Si, Ti, and Zr, R is a hydrocarbon radical, $Y_1$ and $Y_2$ are hydrocarbon radicals, hydroxyl groups, or functional groups generating hydroxyl groups through hydrolysis or the like, and $Z_1$ is a polar group;
   wherein the polar group is not an amino group; and
   wherein the hydrocarbon radicals are each, independently, an alkyl group or an aryl group containing from 6 to 10 carbon atoms.

2. The mechanical component according to claim 1, further comprising an oil repellent film on at least one of the first component and the second component that is less lipophilic than the at least one surface region adjacent to the oil retaining film.

3. The mechanical component according to claim 2, wherein the oil repellent film contains a chemical compound expressed by the following formula (2):

(2)

($M_2$ is one of Si, Ti, and Zr, Rf is a fluorine containing radical, $Y_3$ and $Y_4$ are hydrocarbon radicals, hydroxyl groups, or functional groups generating hydroxyl groups through hydrolysis or the like, and $Z_2$ is a polar group).

4. The mechanical component according to claim 1, wherein the first component comprises a shaft rotatable around an axis, and the second component comprises a bearing rotatably supporting the shaft body.

5. The mechanical component according to claim 1, further comprising a retaining portion in at least one of the first surface region and the second surface region, the retaining portion capable of retaining a lubricating oil.

6. The mechanical component according to claim 5, wherein the retaining portion comprises a recess in the at least one surface region.

7. A mechanism module equipped with the mechanical component of claim 1.

8. A movement equipped with the mechanical component of claim 1.

9. A timepiece equipped with the movement of claim 8.

* * * * *